INVENTORS.
JOE E. DEAVENPORT,
DON W. SEXTON,

DIGITAL VOLTMETER

Original Filed April 3, 1963 17 Sheets-Sheet 2

Jan. 6, 1970 J. E. DEAVENPORT ET AL 3,488,588

DIGITAL VOLTMETER

Original Filed April 3, 1963 17 Sheets-Sheet 4

AMPLIFIER A2

NEGATIVE VOLTAGE
ADD COUNT-SHIFT DIRECT

Jan. 6, 1970 J. E. DEAVENPORT ET AL 3,488,588

DIGITAL VOLTMETER

Original Filed April 3, 1963 17 Sheets-Sheet 11

10° DECADE OF COUNTER

Jan. 6, 1970 J. E. DEAVENPORT ET AL 3,488,588

DIGITAL VOLTMETER

Original Filed April 3, 1963 17 Sheets-Sheet 14

TYPICAL COUNTER FLIP-FLOPS

Jan. 6, 1970 J. E. DEAVENPORT ET AL 3,488,588

DIGITAL VOLTMETER

Original Filed April 3, 1963 17 Sheets-Sheet 15

Jan. 6, 1970 J. E. DEAVENPORT ET AL 3,488,588

DIGITAL VOLTMETER

Original Filed April 3, 1963 17 Sheets-Sheet 16

Jan. 6, 1970 J. E. DEAVENPORT ET AL 3,488,588

DIGITAL VOLTMETER

Original Filed April 3, 1963 17 Sheets-Sheet 17

United States Patent Office 3,488,588
Patented Jan. 6, 1970

3,488,588

DIGITAL VOLTMETER

Joe E. Deavenport and Don W. Sexton, San Diego, Calif., assignors, by mesne assignments, to Weston Instruments, Inc., Newark, N.J., a corporation of Delaware Original application Apr. 3, 1963, Ser. No. 270,336, now Patent No. 3,327,228, dated June 20, 1967. Divided and this application Jan. 3, 1967, Ser. No. 619,106
Int. Cl. G01r *17/06, 19/26*
U.S. Cl. 324—99 1 Claim

ABSTRACT OF THE DISCLOSURE

A digital voltmeter in which an analog input signal is applied through a chopper-stabilized amplifier to an integrator. The output of the integrator is connected to a voltage controlled oscillator (VCO). The output of the VCO and the output of a source of timing signals are both applied to a gate circuit, the timing signals acting to enable the gate circuit and allow the VCO output to pass to a frequency counter circuit. When the gate is not enabled the count in the frequency counter circuit is transferred to a memory and read-out system which produces a numerical indication of the magnitude of the analog input signal. The chopper-stabilized amplifier is periodically compared with a reference voltage. The frequency of comparison is controlled by a frequency related to the output of the VCO by a division factor determined by frequency dividers.

This is a division of application Ser. No. 270,336, filed Apr. 3, 1963, now Patent No. 3,327,228.

This invention relates generally to electrical systems and more particularly to such systems which convert electrical quantities, such as voltages, to cyclic or discrete electrical signals or other types of physical manifestations.

Efforts to accurately measure and indicate voltages have resulted in the development of various types of converter systems. Such systems when including a facility for producing a numerical indication of the input quantity or voltage are usually referred to as "digital volt meters." These instruments in a broad sense usually include a converter capable of converting the input quantity, that is, voltage, to a numerical indication. For this purpose various types of read-out devices may be employed, one type being the conventional numerical wheel counter, and another, and preferred type of device, employs gas discharge tubes stacked adjacent one another in an envelope having a transparent end and covering a range of decimal numbers from zero through 9. The use of pluralities of such number wheels or gas discharge tubes energized by suitable switching circuits controlled by the output of the converter circuits provides a numerical indication of the input voltage.

The control of such numerical indicating devices by prior art converters has proved satisfactory in many applications, but where high-speed operation and high accuracy must be had prior art arrangements are unsatisfactory.

One prior art arrangement utilizes stepping switches which are connected in a bridge circuit. The bridge circuit is electrically unbalanced in an amount proportional to the voltage to be measured and the stepping switches which are energized by the bridge unbalance voltage are used to electrically balance the bridge at which time the stepping switches stop. The electrical configuration of the stepping switches at this point is presumably indicative of the magnitude of the input voltage. The stepping switches may be utilized to selectively energize or control numerical read-out devices of the type referred to above.

In still another prior art arrangement, the speed of operation has been increased somewhat and noise reduced in the use of reed type relays. These relays have small, flexibly mounted contacts which are magnetically actuated. The use of pluralities of such reed relays in suitable circuit arrangements permits switching of the type provided by stepping switches so that the outputs of the reed relays may be used to control suitable numerical indicators.

Although this latter type of device is faster than the stepping switch type, it is still too slow for many applications and the accuracy of the conversion is not suitable for many applications.

Another type of converter circuit which has been employed utilizes a summing integrator which is controlled by an input voltage to control a pulse generator. The output of the pulse generator is then fed back in a negative sense to the input of the summing integrator. The use of a closed loop system in such an arrangement offers some advantages with respect to linearity. However, the application of the input voltage directly to the integrator requires that the integrator cycle at a rate proportional to the magnitude of the input voltage. This is accomplished by using a pulse forming network responsive to a predetermined magnitude of integrator output and forming output pulses. These output pulses are fed back to a recycle each time its output voltage reaches a predetermined summing junction at the integrator input and drive the input circuit in a direction to drive the integrator output to zero. Thus, the cyclic rate of the integrator determines the pulse rate. Such an arrangement may be satisfactory at relatively low frequencies, but at higher frequencies linearity is not satisfactory.

One object of this invention is to provide an improved converter system.

Another object of this invention is to provide an improved voltage to frequency converter.

A specific object of this invention is to provide an improved digital volt meter.

The aforesaid and other objects and advantages are achieved in an arrangement according to the present invention wherein a chopper stabilized potentiometric type of amplifier system is utilized to control a voltage controlled oscillator. The input to the potentiometric type of amplifier is preferably in the form of a voltage which is to be measured. The voltage controlled oscillator may be any suitable type of oscillator which has an output voltage which is substantially linearily related to its input voltage. The system is arranged so that at zero input volts the voltage controlled oscillator will have a particular output frequency which, in one practical embodiment of this intion, decreases with the application of a positive input voltage to the potentiometric amplifier system, and increases when a negative input voltage is applied to the potentiometric amplifier system. The system is further arranged to provide about 99 percent accuracy in the direct conversion of the input voltage to an output frequency at the output of the voltage controlled oscillator.

The output voltage of the potentiometric amplifier system is compared with a reference voltage, in this case a negative reference voltage, and the difference is coupled input-wise to an integrating amplifier. The output of the integrating amplifier, after suitable filtering and additional amplification, if needed, is coupled to the voltage controlled oscillator and provides the remaining 1 percent of regulation required to achieve linearity between the input voltage and the output frequency.

Unlike the prior art devices the integrating amplifier of this invention is referred to ground and a negative precision reference voltage and is operated at a frequency which is well below the frequency of the voltage controlled oscillator. To this end, the input and output circuits of the integrating amplifier are coupled to respective grounding switches forming part of a reset circuit which is controlled by the output of a frequency divider circuit in turn controlled by the output of the voltage controlled oscillator. By this expedient the output frequency of the voltage controlled oscillator is divided to any selected lower frequency and the lower frequency utilized to periodically control switching of the resetting circuit to ground the input and output circuits of the integrating amplifier in the control loop.

In the application of the specific converter in a converter system to achieve a numerical indication of the input voltage, the output of the voltage controlled oscillator is coupled to a gating circuit. This gating circuit is periodically switched and enabled by a suitable timing system including a crystal oscillator. The output of the crystal oscillator controls a timing counter which functions as a frequency divider and has selected output circuits. One of these selected output circuits provides a time interval forming part of the complete timing counter cycle during which the gate is enabled. Thus, a fixed time interval is provided at a suitable repetition rate during which the output of the voltage controlled oscillator is gated. The output of the gate is coupled to a suitable frequency counter. During the remaining part of each timing counter cycle the count in the frequency counter is transferred to a memory and read-out system which produces a numerical indication of the magnitude of the input voltage.

Inasmuch as the voltage controlled oscillator operates at a given frequency for zero input voltage, provision is made in the digital circuits to exhibit zeros on the numerical indicator for this particular condition and to further indicate the application of a positive voltage which reduces the frequency of the voltage controlled oscillator and a negative voltage which increases the frequency of the voltage controlled oscillator. Additionally, provision is made for transferring the 9's complement of the number in the digital portion of the system for numerical read-out purposes at such time as a positive voltage is applied to the input of the potentiometric amplifier system.

Inasmuch as a system of this type has finite capacity for indicating magnitudes of input voltage, provision may be made when voltages greater than those capable of indication within the counting abilities of the system are applied to the input of the potentiometric amplifier system, and, provision made under the control of the digital portion of this system through suitable attenuators at the input to the potentiometric amplifier system to select attenuation values bringing the input voltage within the acceptable range.

The aforesaid and other objects and advantages will be better understood by reference to the following specification when considered in conjunction with the accompanying drawings in which.

Figure 1:
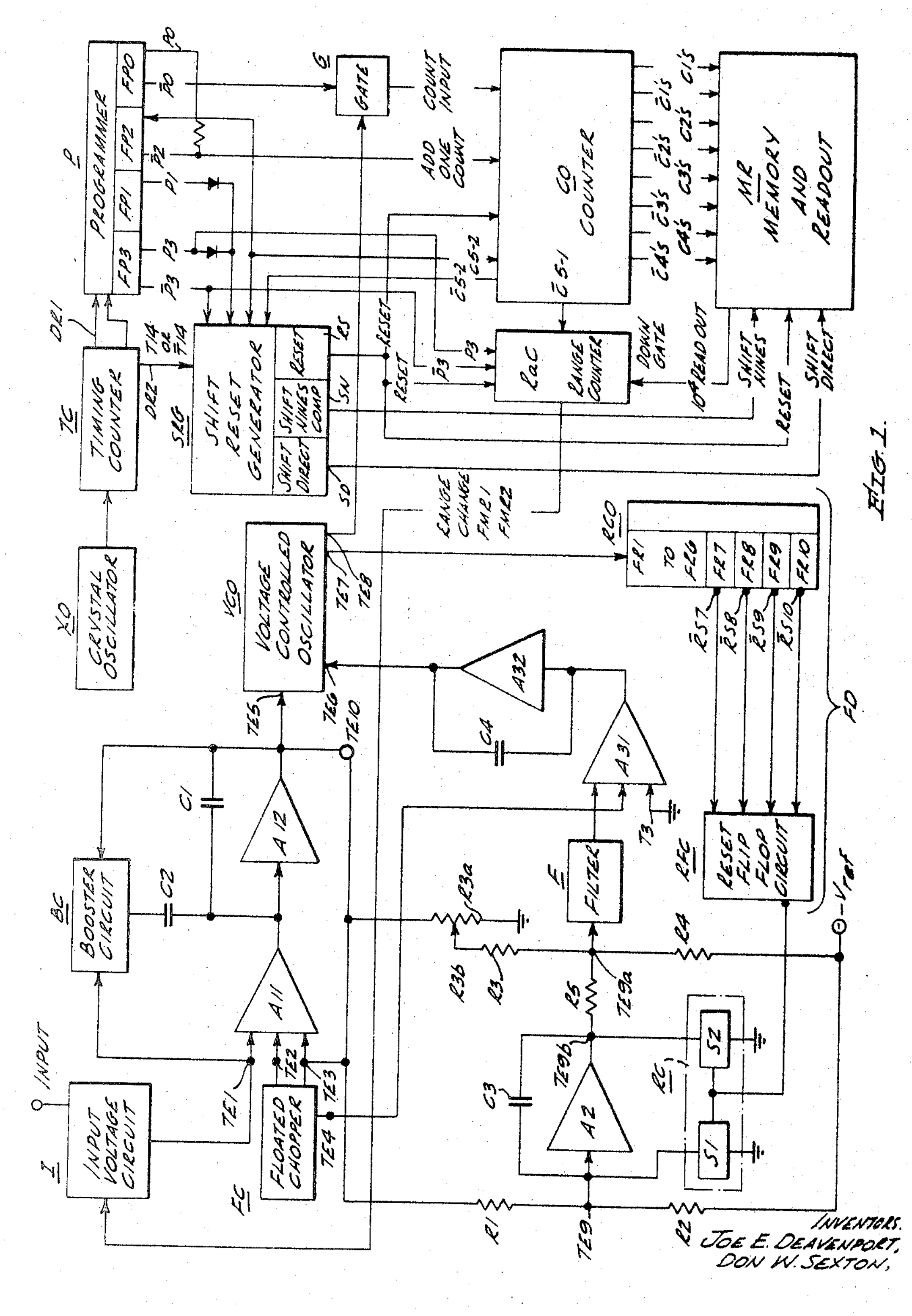
FIGURE 1 is a block diagram of a converter system embodying the principles of this invention.
Figure 6:
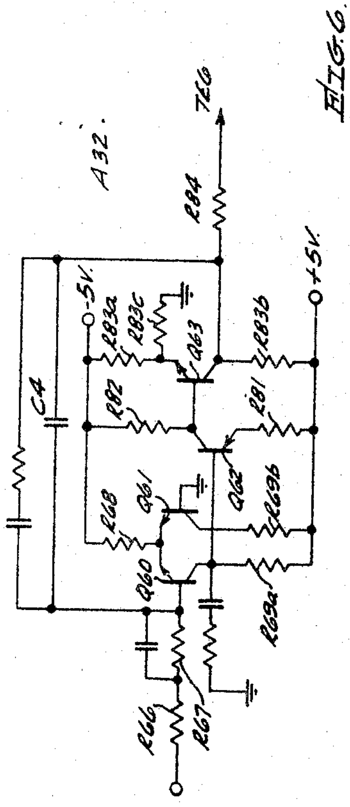
Figure 3:
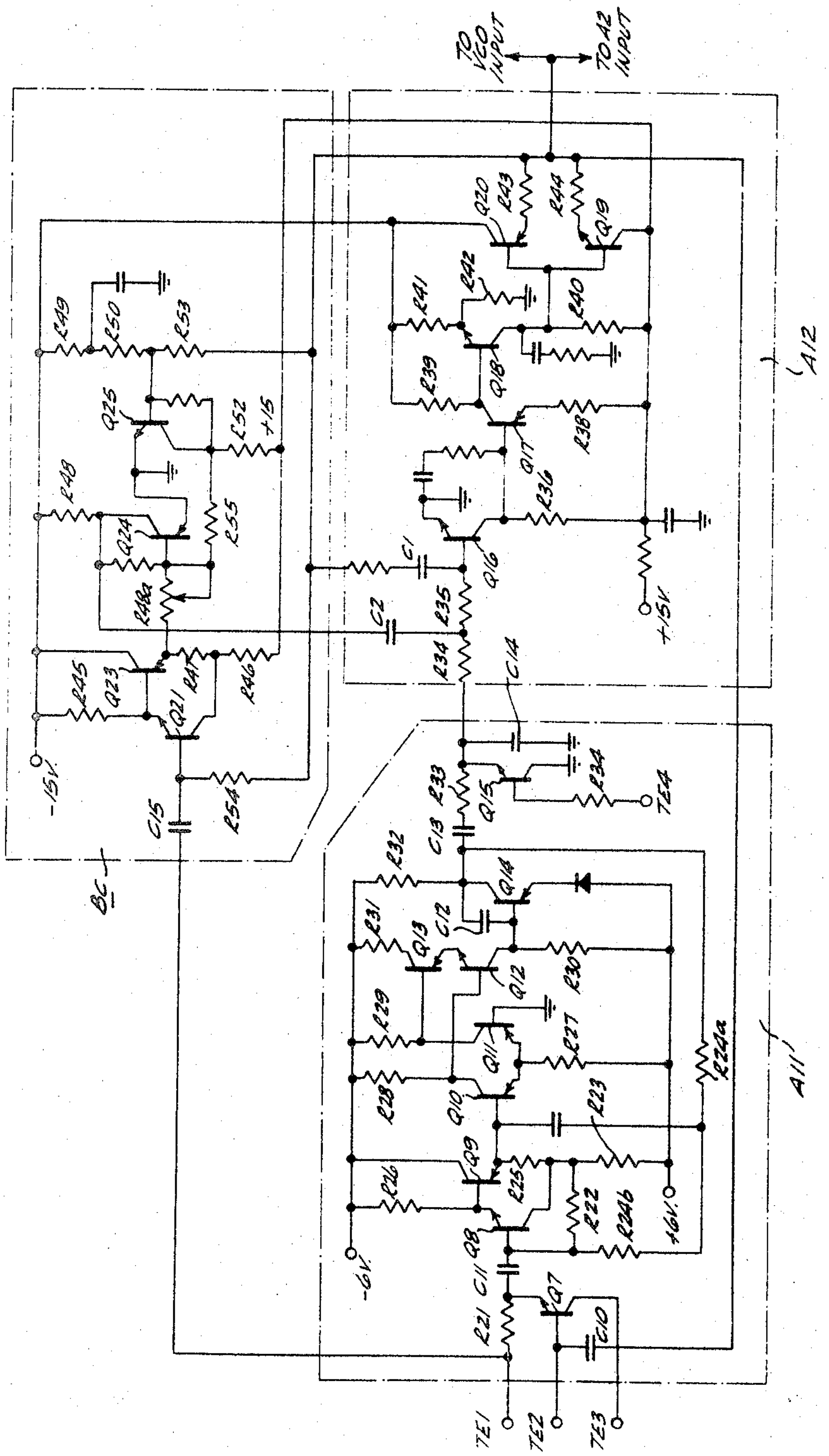
Figure 4:
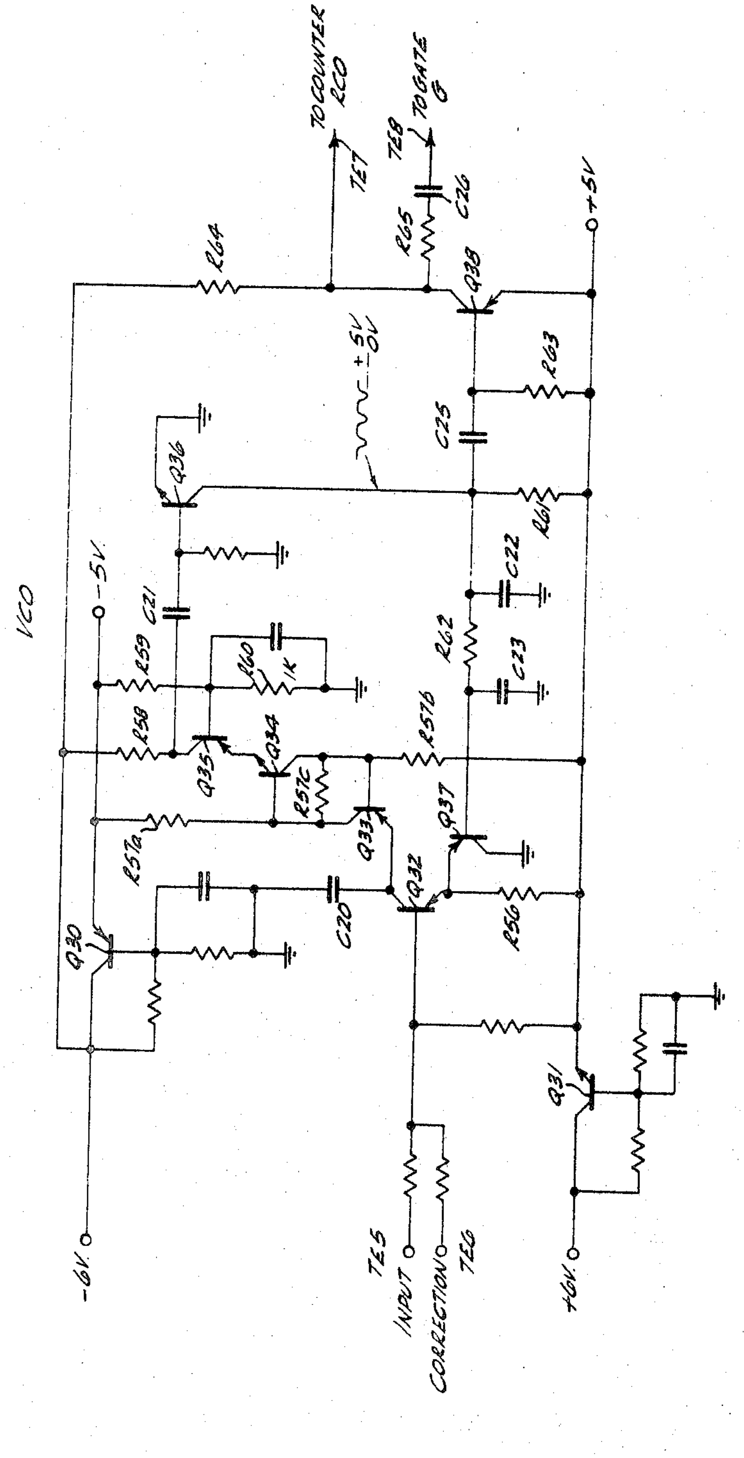
Figure 5:
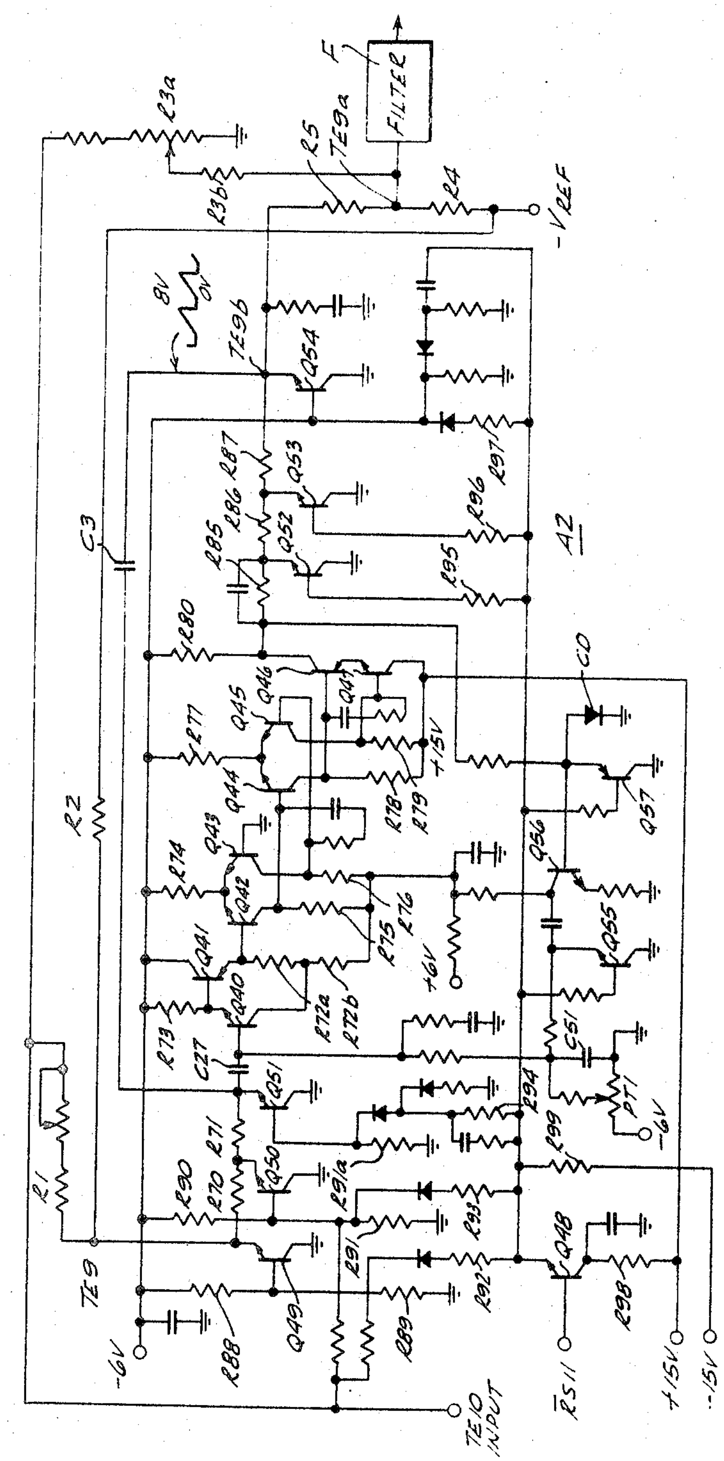
Figure 7:
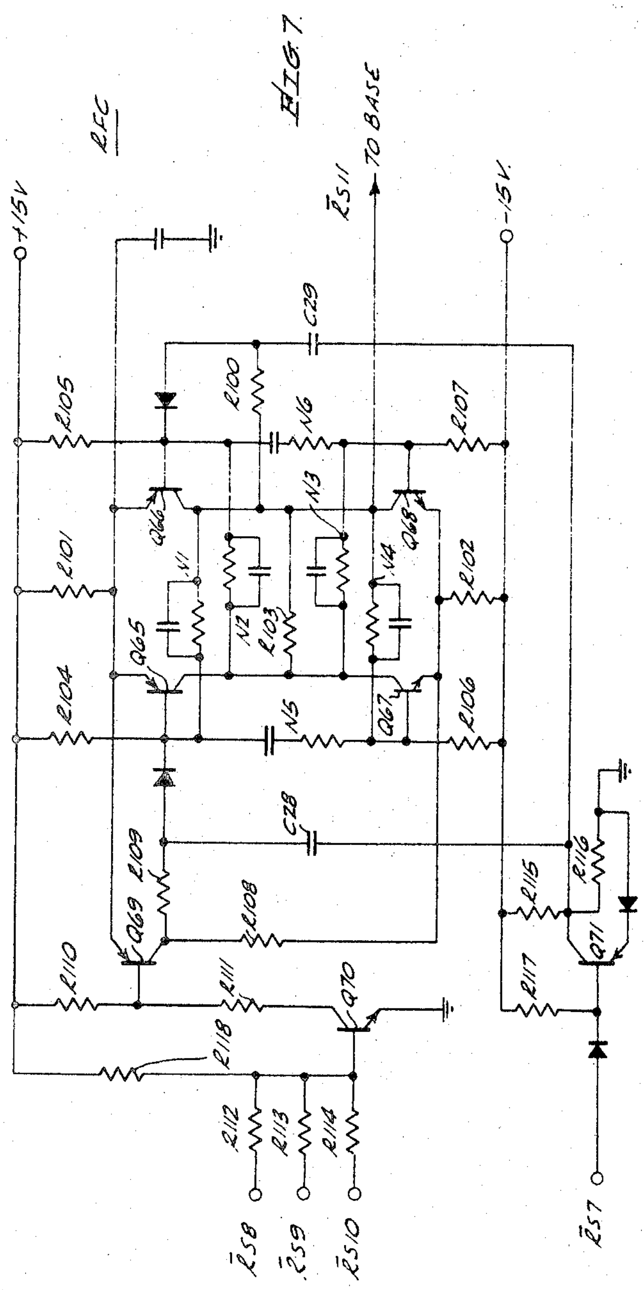
Figure 8:
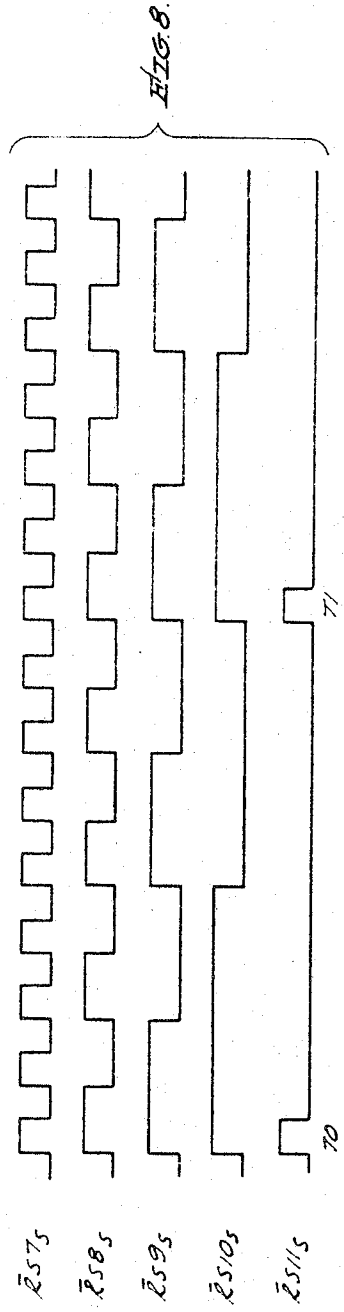
Figure 9:
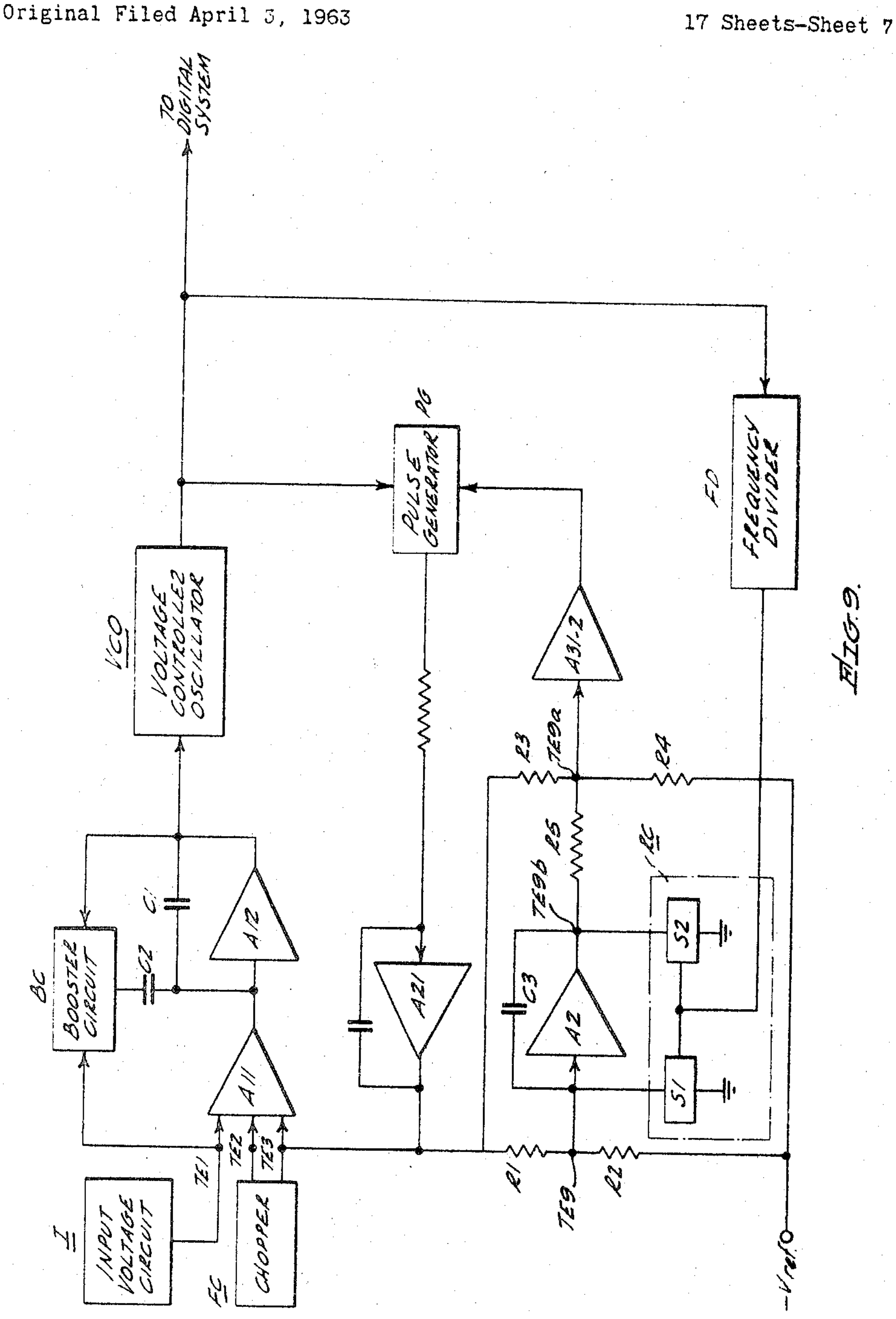
Figure 10:
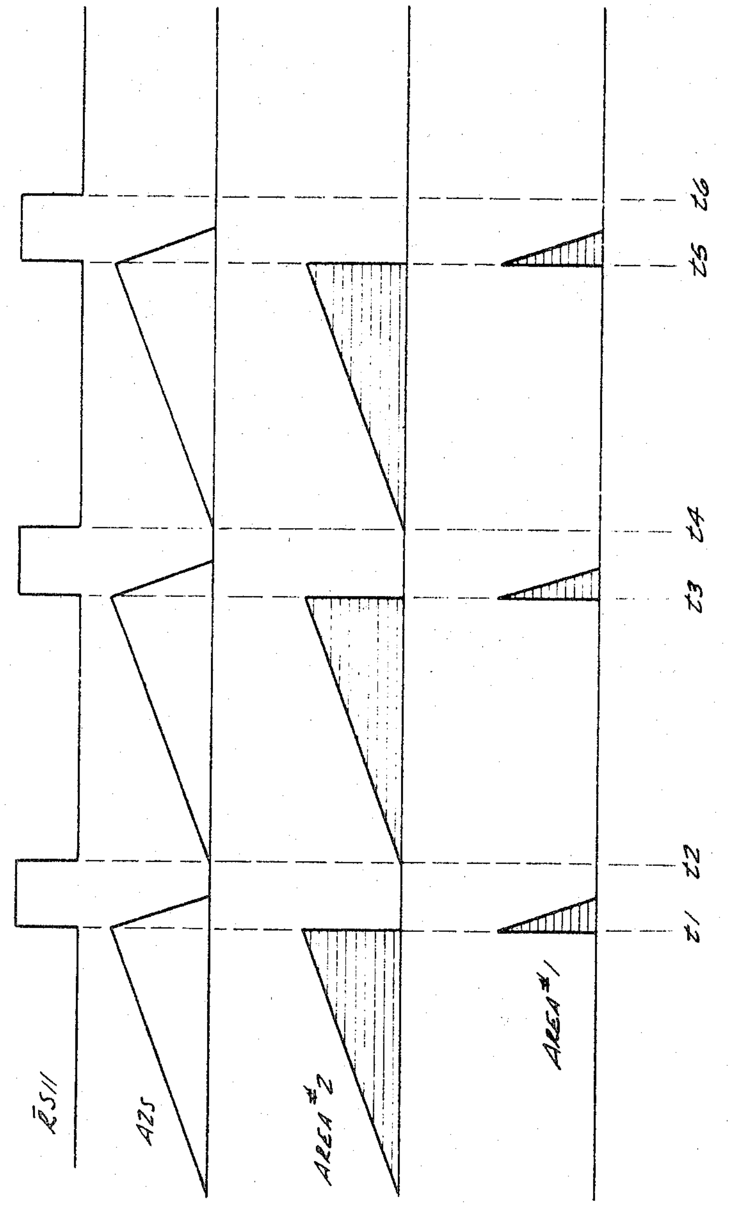
Figure 11:
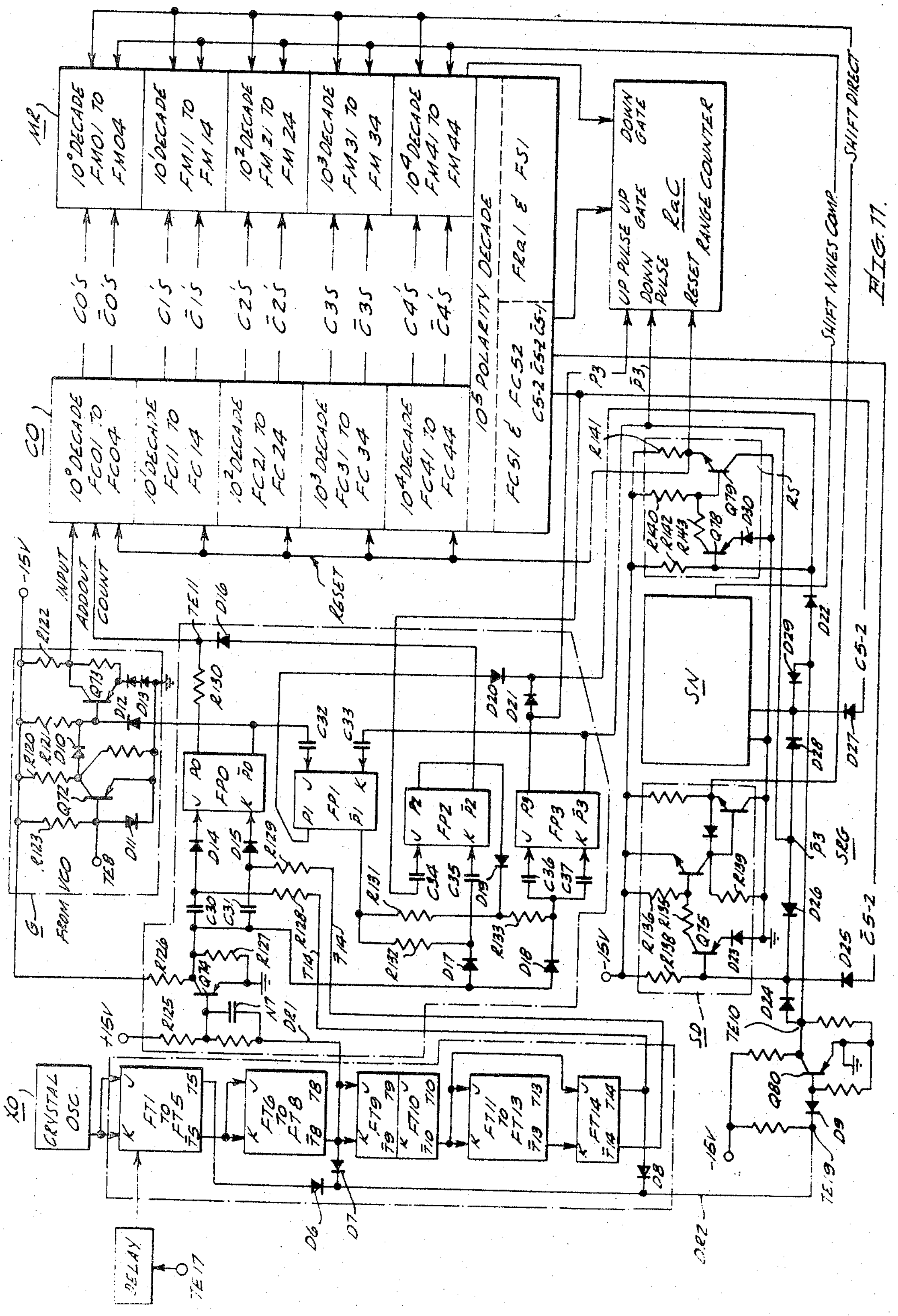
Figure 12:
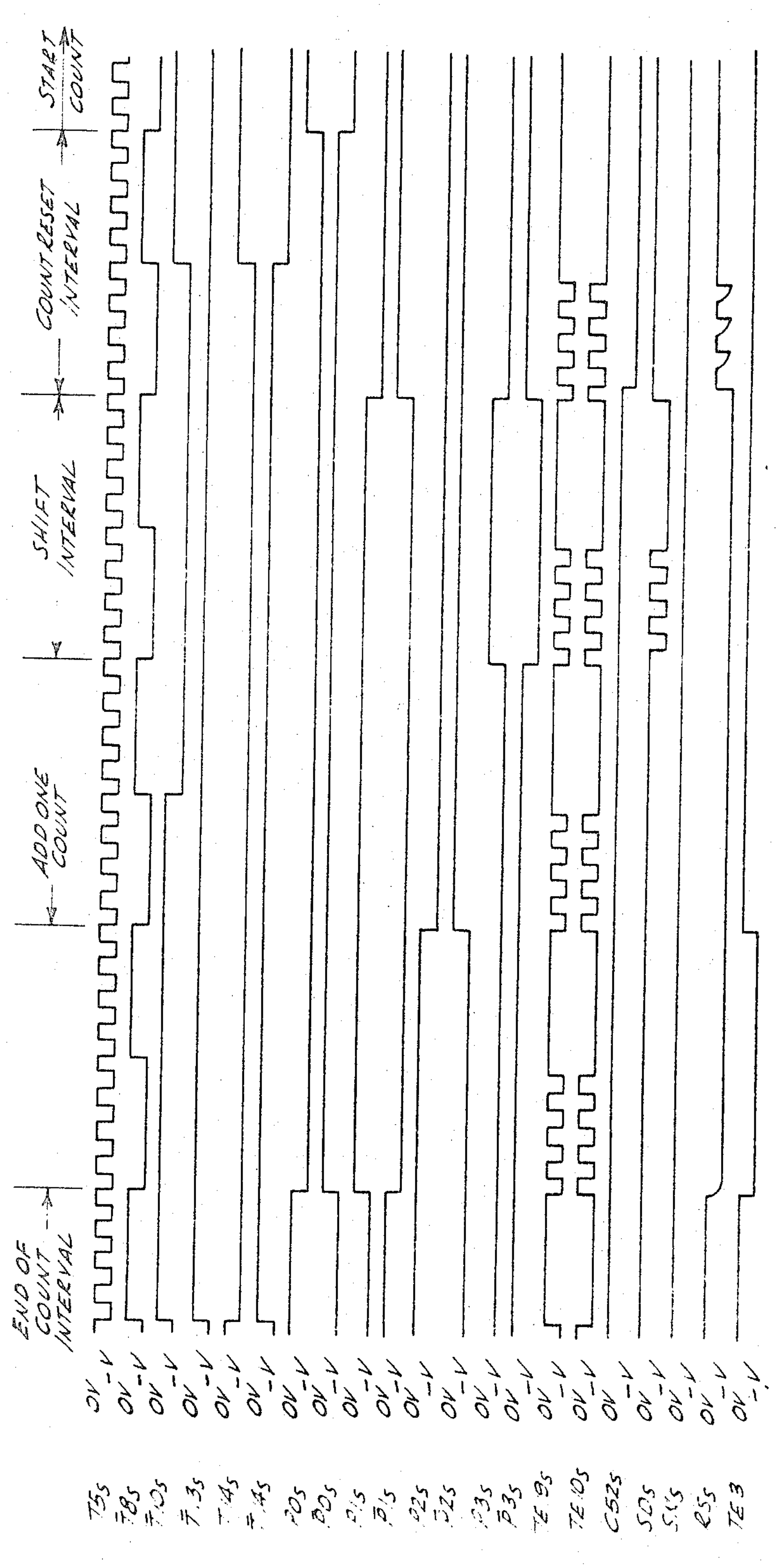
Figure 13:
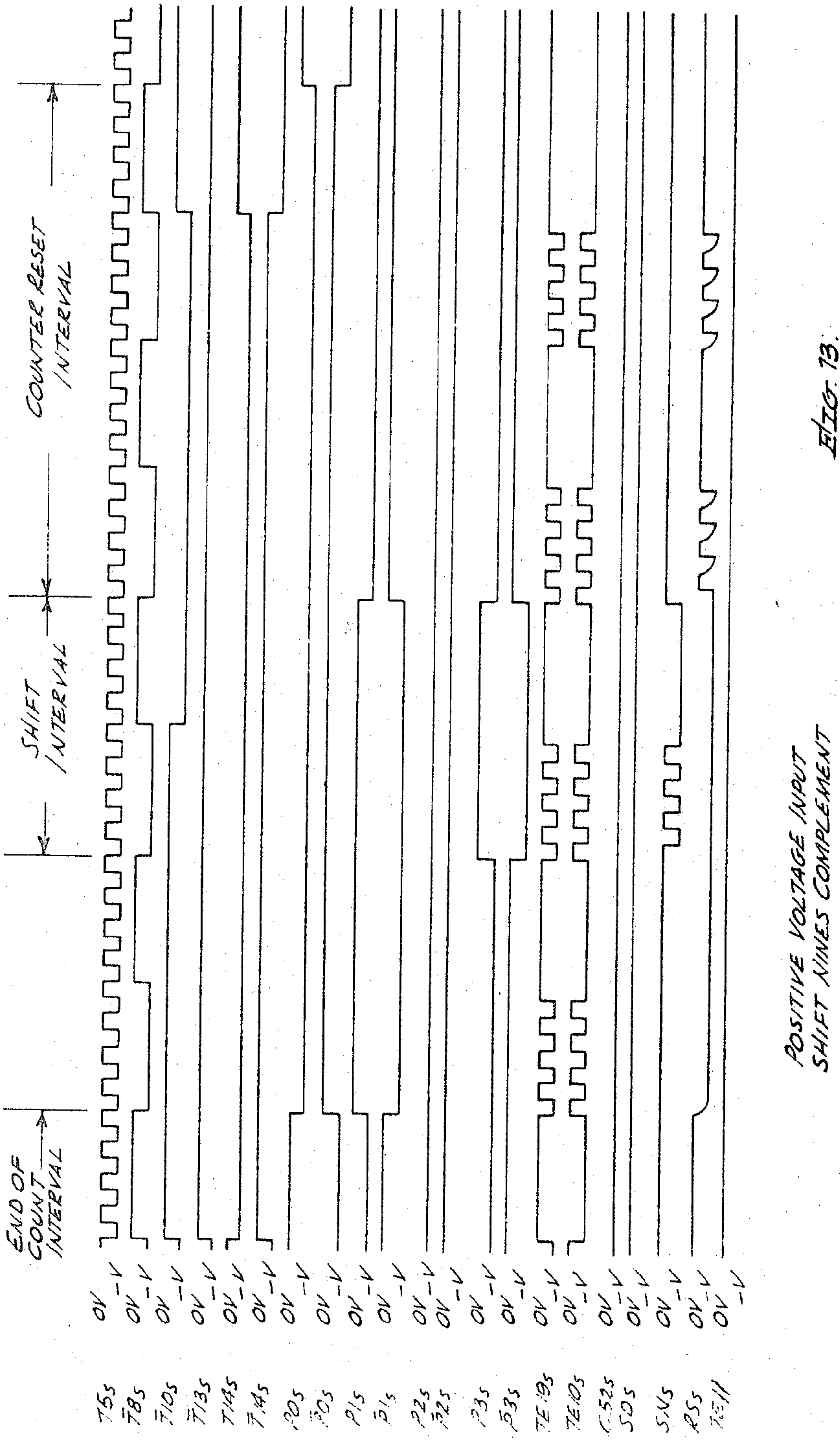
Figure 14:
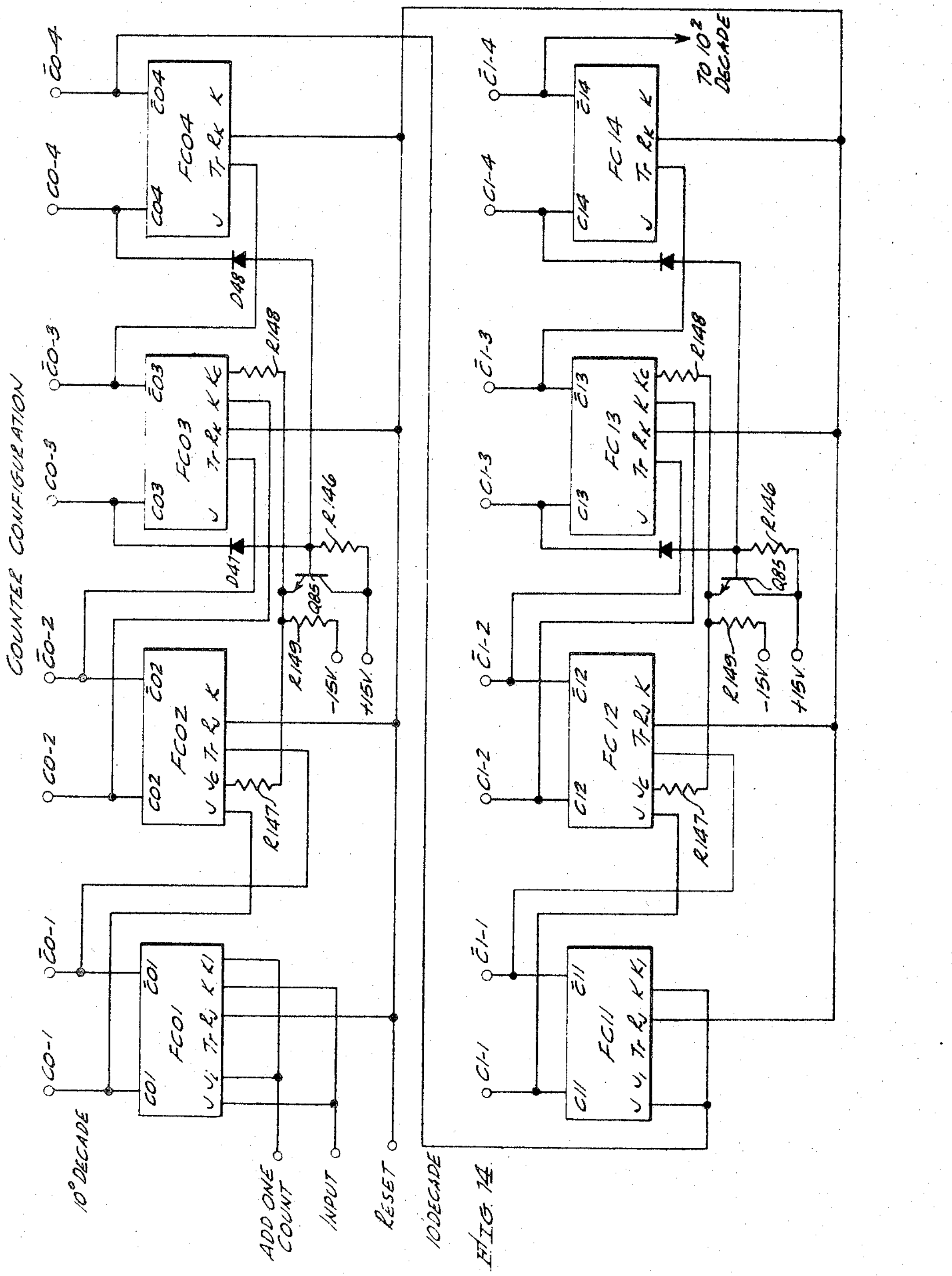
Figure 15:
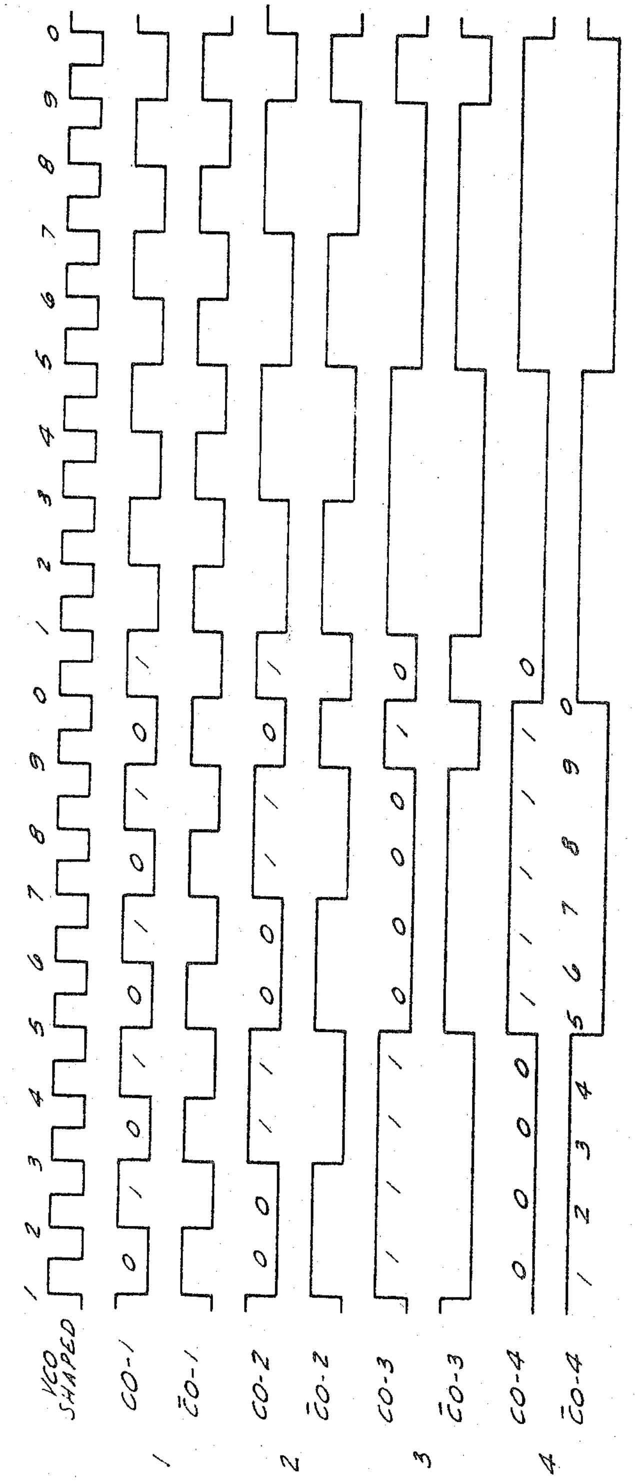
Figure 17:
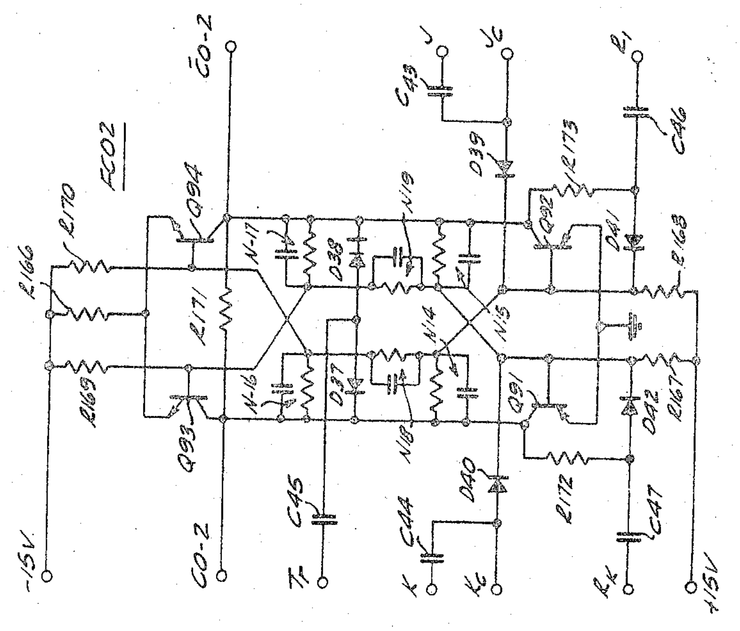
Figure 16:
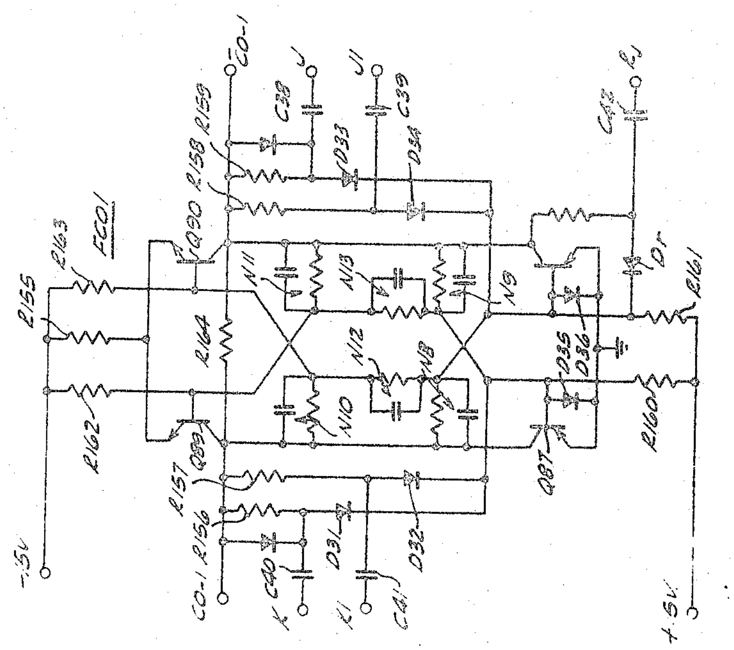
Figure 18:
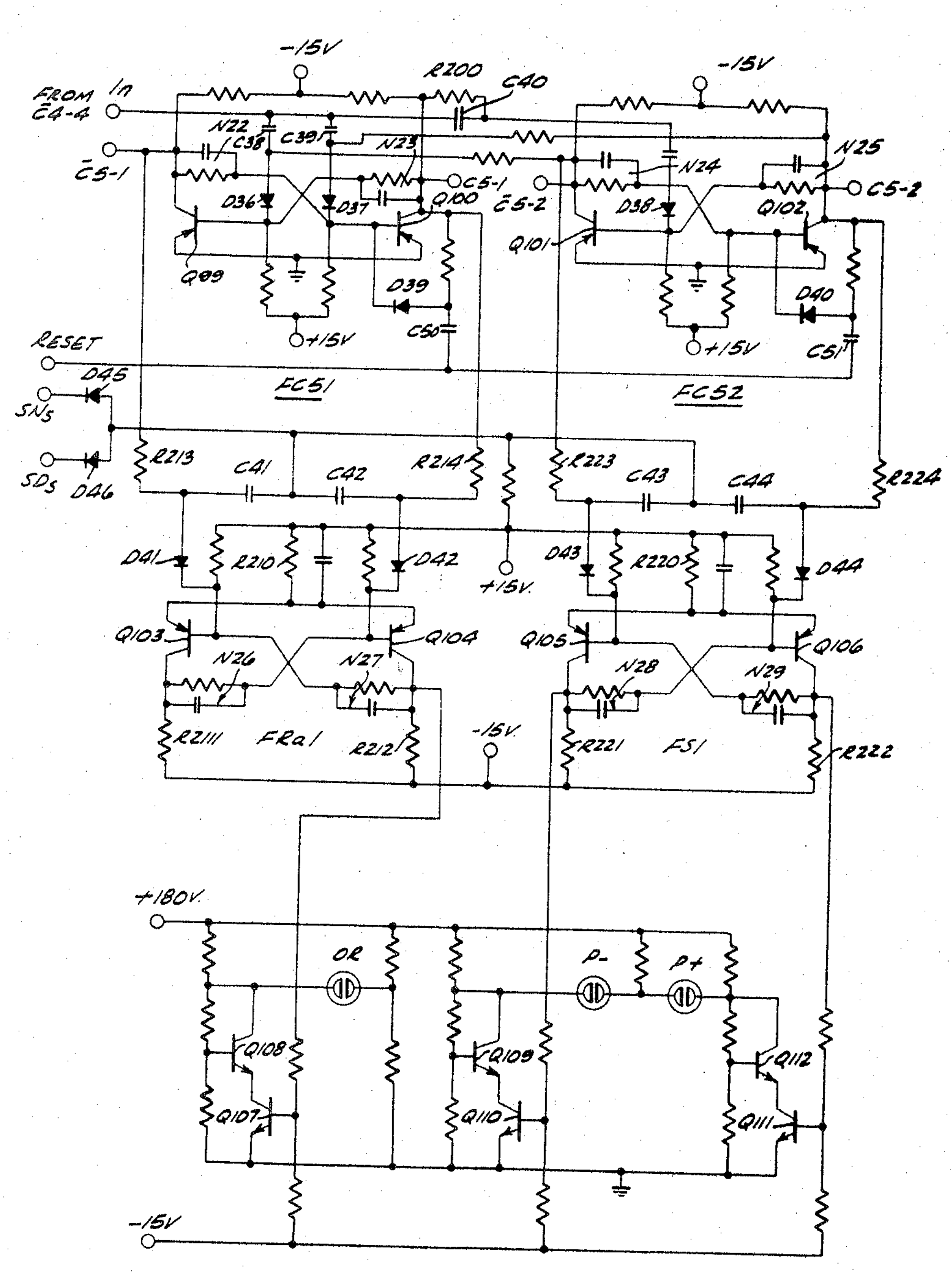
Figure 19:
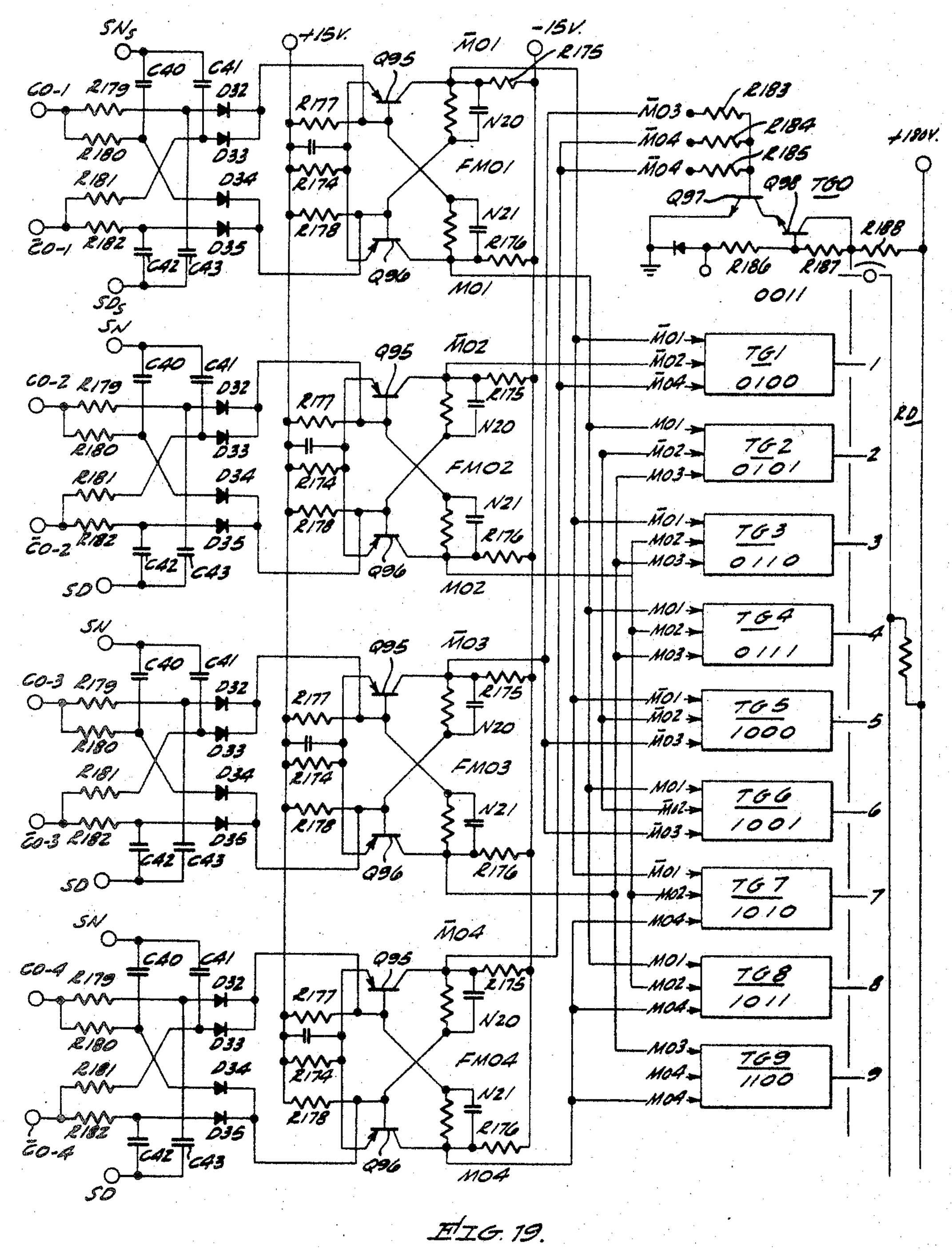
Figure 20:
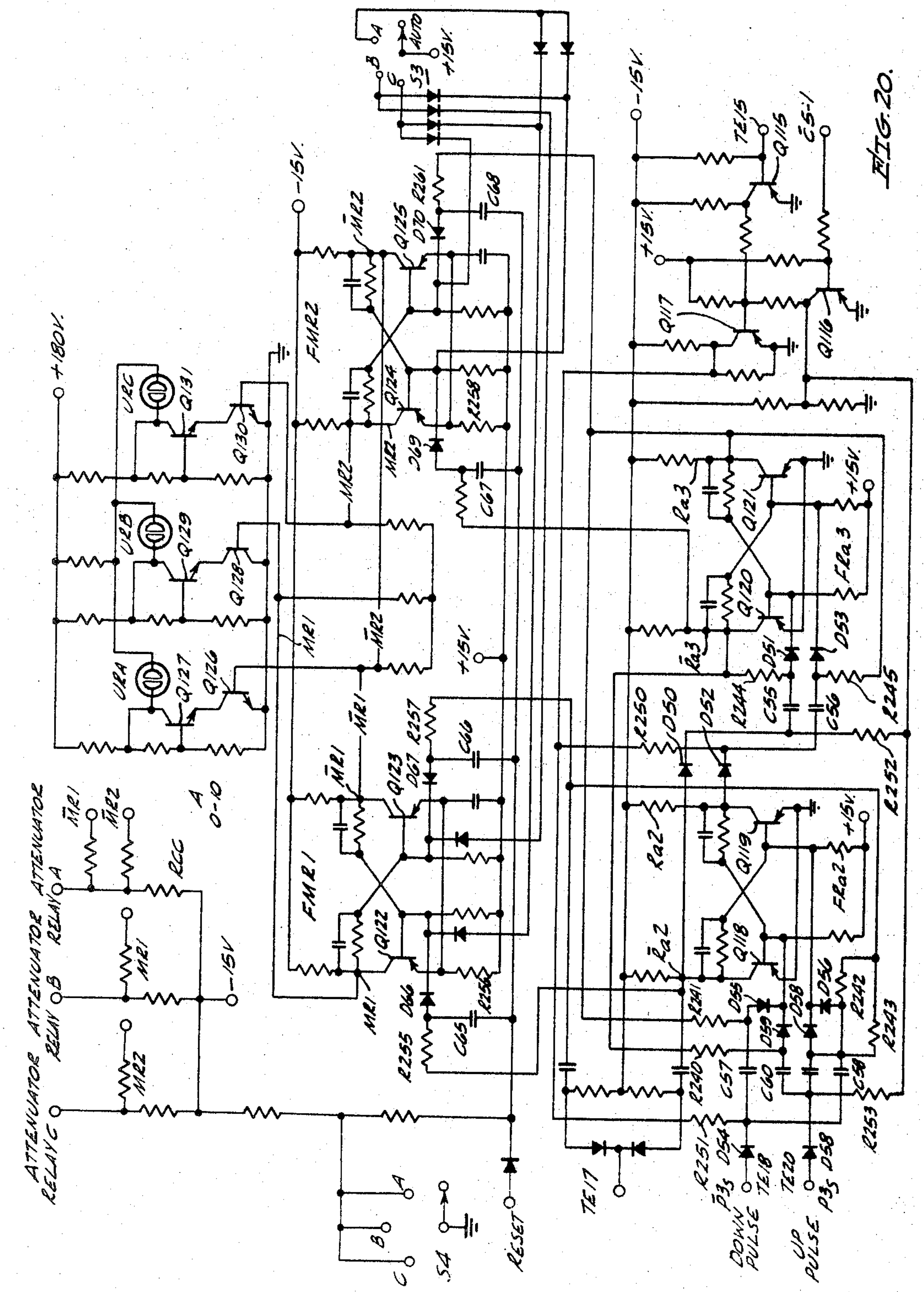

FIG. 3 diagrammatically illustrates the potentiometric amplifier system;

FIG. 4 diagrammatically illustrates the voltage controlled oscillator circuit of the voltage to frequency convertor;

FIG. 5 diagrammatically illustrates an integrating amplifier circuit employed in the voltage to frequency convertor;

FIG. 6 diagrammatically illustrates another amplifier employed in this invention in the voltage to frequency convertor;

FIG. 7 diagrammatically illustrates a reset flip flop employed in this invention forming part of a frequency divider in the voltage to frequency convertor;

FIG. 8 is a timing diagram illustrating several output voltages of the frequency divider circuit;

FIG. 9 is a modification of the voltage to frequency convertor circuit illustrated in FIG. 1;

FIG. 10 graphically depicts certain output voltage characteristics of the integrating amplifier circuit of FIG. 9;

FIG. 11 is a block diagram of the digital portion of the convertor system of this invention;

FIGS. 12 and 13 are timing diagrams depicting operating characteristics of several elements of the digital portion of the system of this invention for negative and positive input voltages, respectively;

FIG. 14 is a block diagram illustrating a portion of a digital counter employed in the digital system of this invention;

FIG. 15 is a timing signal diagram depicting the typical operation of the flip flops of the respective decades of the counter of FIG. 14;

FIGS. 16 and 17 diagrammatically illustrate typical counter flip flops;

FIG. 18 diagrammatically illustrates a polarity and range indicator circuit controlled by the counter and memory and read-out circuits;

FIG. 19 diagrammatically illustrates one memory and read-out decade of this invention and typically represents the other decades; and FIG. 20 diagrammatically illustrates a range control circuit employed in this invention.

CONVERTOR SYSTEM

Voltage to frequency convertor (general)

Referring to FIG. 1, the convertor system illustrated therein includes a convertor circuit for converting a particular input voltage to a corresponding frequency. The input voltage is provided by an input circuit I, generally illustrated in block form, which is coupled to a terminal TE1 at the input of a chopper stabilized amplifier A11 constituting part of a potentiometric amplifier system including additionally an amplifier A12. Amplifier A12 is controlled by the output of the amplifier A11 and is additionally controlled by means of a booster circuit BC in accordance with the differential of input and feedback voltages from terminal TE1 and the output of amplifier A12, respectively, and having an output circuit coupled through a capacitor C2 to the input of the amplifier A12 to increase transient response. The output of the amplifier A12 is coupled input-wise to an input terminal TE5 of a voltage controlled oscillator VCO having respective output circuits represented in terminals TE7 and TE8.

As noted hereinabove, the input voltage circuit may be any suitable type of convertor capable of converting any physical condition to an output voltage, or may be any suitable voltage source.

A floated chopper drive circuit FC is coupled to input terminals TE2 and TE3 of the amplifier A11 to drive the chopper which modulates the input voltage circuit at some predetermined frequency. Terminal TE3 of the amplifier A11 is also coupled to the output circuit of the amplifier A12 completing a feedback voltage circuit around the potentiometeric amplifier system. A feedback capacitor C1 may also be coupled between the output and input circuits of the amplifier A12.

An integrating amplifier A2 having an integrating capacitor C3 has its input circuit coupled to a terminal TE9 forming part of a precision resistor network including a resistor R1 having one end coupled to the output circuit of the potentiometric amplifier system and further including a resistor R2 coupled to the negative reference voltage, here indicated $-V_{ref}$. The output circuit of integrating amplifier A2 is coupled through a resistor R5 to a terminal TE9*a* in a voltage divider network between the feedback circuit of the potentiometric amplifier system and the negative reference voltage $-V_{ref}$. This circuit includes the series connected precision resistors R3 and R4 and a trim resistor circuit including a resistor R3*a* having an adjustable tap R3*b*. Resistor R3 forms part of a linearity adjusting circuit providing controlled compensation of the output of integrating amplifier A2 in dependence upon the output from amplifier A12 to improve the operation.

The output of the integrating amplifier A2 is filtered by means of a filter F the output of which in turn is coupled by an amplifier A31, which again is a chopper stabilized amplifier having its input circuits referenced to ground and being controlled by the output of the chopper drive circuit, being coupled to a terminal TE4 of the chopper coupled input-wise to the amplifier A31.

The output of amplifier A31 is coupled by means of an amplifier A32 to a control input terminal TE6 of the voltage controlled oscillator which completes the control loop.

The integrator amplifier A2 has its input and output circuits periodically grounded by means of a reset circuit, generally designated RC. This reset circuit comprises a pair of switches S1 and S2, respectively, coupled to the input and output circuits. When switches S1 and S2 are closed the input and output circuits are connected to ground as indicated. Switches S1 and S2 in some embodiments may be mechanical types of switches. In accordance with this invention, however, transistors are contemplated as switching elements. As will be described at a later point, pluralities of transistors are embodied in each of the switches S1 and S2 and, as will be described, they are inverted and used as switches to provide fast and positive grounding of the respective circuits.

Control of the switches S1 and S2 is achieved by means of a frequency divider, generally designated FD, comprising a reset counter RCO and a reset flip flop RFC. The reset counter may be any suitable type of counter but as employed herein embodies a plurality of bistable flip flops conventionally cascaded by coupling each output circuit to the next higher order input circuit to achieve conventional binary operation. Such a counter may comprise 10 cascaded flip flops FR1 through FR10, as indicated, in which the output circuits $\overline{RS}7$, $\overline{RS}8$, $\overline{RS}9$ and $\overline{RS}10$ are coupled input-wise to the reset flip flop circuit, to control the reset flip flop circuit to produce a pulse in its output circuit $\overline{RS}11$ once during each counting cycle of counter RCO. The output terminal $\overline{RS}11$ is connected to the switches S1 and S2 to periodically operate these switches to ground the input and output circuits of the amplifier A2. In view of the connection of the frequency divider circuit FD with the voltage controlled oscillator VCO to be controlled thereby, it will be seen that the switching rate or period of the switch S2 is directly controlled by the frequency of the voltage controlled oscillator, the period being longer when the frequency of the voltage controlled oscillator is lower and being shorter as the voltage controlled oscillator output frequency increases. Thus the output voltage of the integrator amplifier is a function of both its input and the time interval during which it operates. This will be understood from the following explanations:

When there is no input voltage coupled to the system, there is a substantially constant current input to the integrator amplifier A2 provided by the voltage reference $-V_{ref}$ and the resistor R2. This current is proportional to the center frequency of the output of the voltage controlled oscillator VCO. Since the reference voltage is a negative voltage, this output of integrator amplifier A2 will be a positive going voltage ramp at a voltage rate determined by the reference voltage and by the values of the resistor R2 and the capacitor C3. This output voltage of the integrator amplifier A2 has an average DC potential that is balanced to ground with resistors R5 and R4 and which is further amplified by the amplifier A31 after filtering. Since there is no input to the amplifier A11, the frequency output of the voltage controlled oscillator VCO is stabilized to a point where the average DC voltage out of the integrator amplifier A2 is effectively balanced out in resistors R5 and R4, providing a virtual zero voltage input to the amplifier A31 (assuming amplifier A31 is a very high gain amplifier). If the output frequency of the voltage controlled oscillator should be too high, the switches S1 and S2 will reset the output of integrator amplifier A2 in a shorter period of time and there will be less positive DC average voltage from the output of integrator amplifier A2. This represents a negative input to the amplifier A31 (which is referenced to ground) and which will therein be amplified to give a positive input to the voltage controlled oscillator VCO to lower its frequency and correct the error. If an input voltage is applied to the amplifier A11 of a positive polarity, a positive going voltage is applied to the input circuit of the voltage controlled oscillator. This results in a lower frequency output providing a longer period of time between the switching cycles of the switches S1 and S2 and consequently a longer period of time between the times when the integrator amplifier A2 is reset. But now the input current to the integrator amplifier A2 will be decreased by the current through resistor R1 which is opposite to the current through resistor R2, and the ramp generated at the output of integrator amplifier A2 will rise at a slower rate, i.e., a lower voltage per second slope characteristic will exist and the average area or average DC output from integrator amplifier A2 will tend to remain constant, if the ratio of the system input voltage to the output frequency of the voltage controlled oscillator is in the desired ratio.

Digital counter (general)

The output terminal TE8 of the voltage controlled oscillator is coupled to a gating circuit, generally designated G. As will be explained hereafter, such a gating circuit may be a transistor gate which is enabled at such time as a signal $\overline{PO}s$ is in the lower of its two voltage states, and disabled at such time as the signal $\overline{PO}s$ is in the higher of its two voltage states. The signal $\overline{PO}s$ is generated by a flip flop FPO forming part of a programmer, generally designated P and which includes additionally flip flops FP1, FP2 and FP3.

The programmer P is controlled by means of a timing counter, generally designated TC, having a first output driving circuit DR1, coupled input-wise to control the flip flops of the programmer P, as will be described in greater detail hereafter, and having additonally a control output circuit by means of which the signals T14*s* or $\overline{T}14s$ are coupled to the programmer. The control signals T14*s* and $\overline{T}14s$ control the counting and operating intervals of the digital system.

The timing counter TC establishes system timing and for this purpose it must operate in precise time intervals. To this end the timing counter is controlled or driven by means of a crystal oscillator, generally designated XO which operates at some fixed frequency, say of the order of 100 kilocycles, and has an electrical output directly coupled to the timing counter. As will be explained hereinafter, the timing counter comprises a plurality of flip flops FT1 through FT14 and functions essentially as a frequency divider in producing the several electrical outputs which are indicated.

The output of the gating circuit G is coupled as the count input to the input circuit of a counter represented as a block, generally designated CO. As will be explained, this is a decimal counter and comprises four complete 4-flip flop decades producing respective groups of signals CO–1 through CO–4 and $\overline{CO}$–1 through $\overline{CO}$–4. These signals in any suitable binary code indicate the number of pulses applied to the input circuit of the counter during the interval in which the gate G is enabled. Thus, the output of the counter is a binary number representative of the magnitude of the input voltage.

These number indicating signals are coupled input-wise to a memory and read-out circuit indicated as a block and generally designated MR, which stores the output of the counter circuit. The memory and read-out circuit also includes a suitable read-out device such as a numerical indicator of the type described hereinabove which is coupled to and controlled by the storage circuits. The details of these circuits will be explained at a later point. The counter CO includes two additional flip flops FC51 and FC52 in a final or highest order decade. These flip flops produce outputs $\overline{C5}$–1, C5–2 and $\overline{C5}$–2 which are voltage state signals. When flip flop FC51 is in its "1" representing electrical state, this indicates a positive input voltage has been applied to the input circuit I. When flip flop FC52 is also in its "1" representing electrical state, this indicates that a negative input voltage has been applied to the input circuit I.

These flip flop signals are used along with a number of other signals from the programmer P to control a shift reset generator, generally designated SRG, and comprising a shift direct circuit, a shift 9's complement circuit and a reset circuit, respectively designated SD, SN and RS. The output of the circuits SD and SN are coupled to the memory and read-out circuit MR to control the transfer of information from the counter CO to the storage portion of the memory and read-out circuit. To this end at such time as the signal $\overline{C5}$–2 is in the lower of its two voltage states, circuits may be established for enabling the shift direct circuit SD to directly transfer the contents of the counter CO to the storage portion of the memory and read-out circuit MR. On the other hand, at such time as the signal C5–2 is in the lower of its two voltage states, indicating that a negative number had been coupled to the input to the converter system, the shift 9's complement circuit SN may be enabled and the shift 9's complement signal applied to the memory and read-out circuit MR is operable to transfer the 9's complement of the number in the counter CO to the storage portion of the memory and read-out circuit MR.

The shift and reset generator SRG is controlled by a second output drive circuit DR2 from the timing counter TC. Thus, the operation of the shift and reset generator is synchronized with the operation of the programmer P. The programmer, in addition to controlling enabling of the gate G as described, also controls the counter to add an additional count thereto represented in the signal $\overline{P2}$ from the flip flop FP2 at such time as the numerical contents of the counter CO are to be transfererd directly to the storage portion of the memory and read-out circuit MR. The flip flops FP1 and FP3 produce electrical outputs which are coupled to the shift reset generator SRG to control operation thereof. As will be explained in detail at a later point, the signals PO and $\overline{P2}$ control the addition of a count to the counter CO prior to transferring the contents of the counter directly to the storage section of the memory MR. The signal $\overline{PO}$ controls enabling gate G. The signals P1*s* and P3*s* together control the reset section RS of the shift reset generator and the signal $\overline{P3}$ controls the shift direct and shift 9's complement sections of the shift reset generator.

Provision for scaling the input to the converter system is provided by means of a range counter, generally designated R*a*C. At any time that the input voltage, whether positive or negative, exceeds the range acceptable to the converter system, suitable indications will be established in the system to effect operation of the range counter, which has an output circuit coupled to the input voltage circuit I, so that a down-range or up-range signal coupled to the input voltage circuit will shift the magnitude of the input voltage to that acceptable to the system. As will be explained at a later point, the range counter R*a*C includes an up gate and a down gate, together with an up down counter, bistable storage circuits, range indicators and attentuators relay controls for the purpose of generating and indicating the up range and the down range signals. The signal $\overline{C5}$–1 from the counter CO is coupled to the up gate of the range counter and a signal from the memory and read-out section is coupled to the down gate of the range counter. This down range signal is derived form a control circuit associated with the read-out devices of the memory and read-out circuit, as will be explained.

VOLTAGE TO FREQUENCY CONVERTER

(Detail circuits)

The voltage to frequency converter, as described in connection with the converter system of FIG. 1, includes a plurality of amplifiers and an integrator circuit arranged to provide substantially linear conversion of an input voltage coupled to the voltage to frequency converter to a time varying voltage at the output of the voltage controlled oscillator, which has a frequency proportional to the magnitude and sign of the input voltage with respect to ground. This converter will be better understood by reference to certain particular details which are illustrated in FIGS. 2 through 8, inclusive.

FLOATED CHOPPER DRIVE CIRCUIT FC

Figure 2:
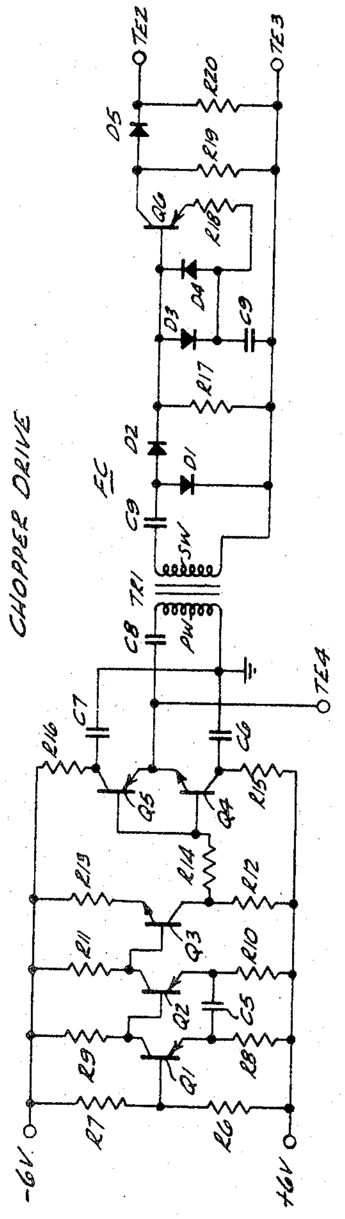
FIG. 2 is a diagrammatic illustration of a chopper circuit employed in stabilizing the potentiometric amplifier system of the voltage to frequency convertor herein.

As described in FIG. 1, the amplifier A11 is a chopper stabilized amplifier, the input of which is chopped or modulated by means of the output of a floated chopper driven by a floated chopper drive circuit, generally designated FC. A suitable chopper drive for application herein is illustrated in FIG. 2 and comprises a multivibrator including the p-n-p transistors Q1 and Q2, the output of which drives an n-p-n transistor Q3, the collector of which is coupled by a resistor R14 to the bases of a complementary pair of transistors Q4 and Q5.

The power supply for the circuit is represented in the terminals identified +6 v. and −6 v. The transistor Q1 of the multivibrator has its base coupled to the common terminal of the voltage divider connected between +6 v. and −6 v. and including the resistors R6 and R7 in series therein. The voltage division is such that the transistor Q1 tends to conduct when its emitter voltage rises above the fixed base voltage. The emitter of transistor Q1 is connected by resistor R8 to +6 v. and the collector thereof is connected to −6 v. by means of a resistor R9. The collector of the transistor Q1 is also connected to the base of the transistor Q2. Transistor Q2 has its emitter connected to +6 v. by a resistor R10 and its collector connected to −6 v. by a resistor R11. A capacitor C5 connects the emitters of the transistors Q1 and Q2. Normally, the transistor Q2 tends to conduct. During this period the capacitor C5 charges and the emitter of transistor Q1 moves towards +6 v. When the transistor Q1 conducts, its collector tends to increase in voltage which cuts off transistor Q2 temporarily. The cycle is controlled by the rate of charge and discharge of the capacitor C5. When transistor Q2 is conducting its collector circuit biases the base of transistor Q3 sufficiently positively with respect to its emitter that transistor Q3 conducts and when transistor Q2 decreases in conduction the base voltage on transistor Q3 decreases and the transistor Q3 conducts less. The collector voltage of transistor Q3 is thus a time varying voltage and as it increases and decreases the base biases of the complementary pair of transistors Q4 and Q5 change in such sense that one conducts more than the other and vice versa.

The collector circuits of transistors Q4 and Q5 are coupled by capacitors C6 and C7, respectively, to the grounded side of the primary winding PW of a transformer TR1, the other side of which is coupled by capacitor C8 to the common emitter circuit of the transistors Q4 and Q5. The alternating output of the chopper circuit coupled to the primary winding is thus referred to ground potential at this point.

The floated output is achieved in a circuit including a secondary winding SW of the transformer TR1, one side of which is coupled to the base of an output transistor Q6 through a capacitor C9 and a diode D2 in series. A diode D1 has its cathode connected between the capacitor C9 and the diode D2, and its plate connected to the other side of the secondary winding of the transformer. A loading resistor R17 is connected across the circuit from the common side of the secondary winding of the transformer to the plate of the diode D2. The emitter of the transistor Q6 is coupled by a resistor R18 and a capacitor C9 to the common side of the secondary winding SW and the common terminal between this resistor and capacitor is coupled to the base of the transistor through oppositely poled clamping diodes D3 and D4. The output circuit includes a series connected diode D5 and load resistors R19 and R20 coupled to the plate and cathode, respectively, of diode D5 and to the common side of the transformer winding. The floated output terminals are designated TE2 and TE3. A third output terminal is designated TE4 and, as will be described at a later point, is used elsewhere in the circuit.

AMPLIFIER A11

The terminals TE2 and TE3 of the floated chopper drive circuit, as seen in FIG. 3, are connected to the base and collector circuit, respectively, of an n-p-n transistor Q7 used as a chopper or modulator. The emitter of transistor Q7 is coupled by a capacitor C11 to the base of an n-p-n input transistor Q8 of the chopper stabilized amplifier A11. The input terminal TE1 coupling the input voltage circuit I to the input of the chopper stabilized amplifier A11 is coupled to the capacitor C11 by a resistor R21. The emitter circuit of the transistor Q8 is coupled to the base of a p-n-n transistor Q9, the emitter circuit of which in turn is coupled to the base of a p-n-p transistor Q10 of a difference amplifier, the other transistor of which is also a p-n-p transistor and is designated Q11. The difference amplifier is referred to ground by the grounded base of the transistor Q11. The collector circuits of the transistors Q10 and Q11 of the difference amplifier are coupled to the respective bases of the complementary transistors Q12 and Q13 which are connected in series across the power supply and the collector circuit of the transistor Q12 is coupled to the base of a p-n-p transistor Q14, the emitter of which is diode coupled to the positive side of the power supply and the collector of which is connected by a suitable resistor R32 to the negative side of the power supply. The collector circuit of transistor Q14 is coupled through suitable feedback resistors R24*a* and R24*b* to the base of input transistor Q8 and is further coupled through a capacitor C13 and a resistor R33 to the emitter of an n-p-n transistor Q15 having a grounded collector. Transistor Q15 functions as a demodulator and to this end has its base coupled to terminal TE4 of the floated chopper drive circuit FC by means of a resistor R34. The parameters of the amplifier A11 are such that in one practical embodiment of this invention the amplifier provides approximately 60 db–DC gain.

AMPLIFIER A12

The output of the amplifier A11 is coupled to the base of an n-p-n transistor Q16 which is the input transistor of the amplifier A12. The coupling circuit includes the series connected resistors R34 and R35. The power supply for this amplifier is represented as +15 v. and −15 v. as shown. The emitter of the transistor Q16 is grounded and its collector is coupled to +15 v. through a resistor R36. The collector circuit of the transistor Q16 is coupled to and controls the base of a p-n-p transistor Q17 having an emitter circuit coupled to +15 v. through a resistor R38 and a collector circuit coupled to −15 v. by a resistor R39. The collector circuit of this transistor is directly connected to the base of an n-p-n transistor Q18, the collector of which is connected to the positive side of the power supply by resistor R40 and the emitter of which is connected to the common terminal between a pair of series connected resistors R41 and R42 connected as a voltage divider between the negative side of the power supply and ground. The output of the amplifier A12 comprises a complementary pair of transistors Q19 and Q20, the bases of which are commonly connected to the collector of transistor Q18, and the emitters of which are connected to a common output circuit through resistors R43 and R44. The collectors of the output transistors are directly connected to the positive and negative sides of the power supply as indicated.

As described in connection with FIG. 1, the input voltage applied to the input terminal TE1 of the amplifier A11 may swing in both positive and negative directions within predetermined limits. In one specific version of the amplifier A11, the output voltage could swing between ±2 to 3 volts, peak to peak. The output voltage of amplifier A12 varies between ±10 v. approximately, peak to peak for about 1/10 volt at the output of A11. The circuit illustrated for the particular parameters chosen provides approximately 40 db–DC gain and is of the same phase as the input voltage to amplifier A11. Feedback from the output circuit of the amplifier A12 is directly connected to the collector of the chopper transistor Q7 at the input of the amplifier A11 closing the loop and providing good regulation and consequently high linearity from input to output.

BOOSTER CIRCUIT BC

Improvements in transient response are achieved in a circuit of this type by means of a specific booster circuit generally designated BC. This booster circuit comprises an n-p-n transistor Q21, the base of which is coupled by a capacitor C15 to the input circuit of amplifier A11 and the collector of which is coupled to the common terminal of a pair of series connected resistors R46 and R47 connected between the positive power supply and the emitter of a p-n-p transistor Q23. The emitter circuit of transistor Q21 is coupled to the negative side of the power supply through a resistor R45 and is further directly coupled to the base of transistor Q23, the collector of which is connected directly to the negative side of the power supply.

The output transistor is designated Q24. It is a p-n-p transistor having a grounded emitter and a collector coupled to the negative side of the power supply by a resistor R48. Coupling resistor R48*a* couples the base of the transistor Q24 to the emitter circuit of transistor Q23. The base bias of transistor Q24 is further controlled by means of an n-p-n feedback transistor Q25 having a grounded emitter and having a collector coupled to the positive side of the power supply through a resistor R52 and coupled to the base of the transistor Q24 by a resistor R55. The base circuit of transistor Q25 is coupled by a resistor R53 to the output circuit of the amplifier A12. This base circuit is also coupled to the negative side of the power supply through the resistors R49 and R50. The output of the booster circuit is taken from the collector circuit of transistor Q24 and is coupled to the common terminal between the resistors R34 and R35 in the input circuit to the amplifier A12 by means of a coupling capacitor C2. Thus, the AC components representing the amplified difference between the input to this potentiometric amplifier system and the feedback from the output therefrom is utilized to provide hard driving of the input of the amplifier A12 to increase the transient response characteristics.

VOLTAGE CONTROLLED OSCILLATOR VCO

As will be seen by reference to FIG. 1, the output of the amplifier A12 is coupled to a terminal TE5 of the voltage controlled oscillator VCO. This terminal is identified in FIG. 4 and labeled "input." The voltage controlled oscillator VCO is a voltage-sensitive oscillator circuit which is arranged to operate at a predetermined frequency when there is zero input voltage. The frequency of oscillation decreases with the application of a positive voltage to input terminal TE5 and increases with the application of a negative voltage to this input terminal. The oscillator is provided with a regulated voltage supply, here designated +5 v. and −5 v., which is provided from a 6 volt source, as indicated, and regulated by a pair of current regulating transistors Q30 and Q31, as indicated. The oscillator circuit comprises a p-n-p input transistor Q32, the base of which is resistor coupled to the input terminal TE5, the emitter of which is coupled to the positive side of the regulated voltage supply by a resistor R56 and the collector of which is coupled to ground by a capacitor C20.

The output of the collector circuit of the transistor Q32 is essentially a sawtooth configuration and is coupled directly to the emitter of a p-n-p transistor Q33, the base of which is coupled between resistors R57*b* and R57*c* connected in series with a resistor R57*a* across the power supply indicated. The common terminal of resistor R57a and R57b is connected to the collector of the transistor Q33 and to the base of the transistor Q34. Transistor Q34 constitutes one transistor of a complementary pair including a transistor Q35 and which have their emitters commonly connected. The collector circuit of transistor Q34 is connected through resistor R57*b* to +5 v. as shown and the collector of the transistor Q35 is connected through resistor R58 to −6 v., as indicated. The base of transistor Q35 is coupled to the common terminal of resistors R59 and R60 forming a voltage divider between −5 v. and ground. A capacitor shunts resistor R60. The collector circuit of transistor Q35 is coupled by means of a capacitor C21 to the base of an n-p-n transistor Q36 having a directly grounded emitter. The collector of transistor Q36 is coupled to +5 v. by means of resistor R61. Negative feedback is taken from the collector circuit of transistor Q36, filtered by capacitors C22 and C23 and resistor R62 and applied to the base of a p-n-p transistor Q37 having a grounded collector and having an emitter connected to the emitter circuit of the input transistor Q32.

The input to the base of transistor Q36 is a positive going pulse. Transistor Q36 is an n-p-n transistor and thus tends to increase in conduction each time one of the positive going pulses is applied to the base. The collector circuit of the transistor Q36 is therefore effectively switched between approximately +5 v. and ground potential producing the inverted pulse indicated. The collector circuit of transistor Q36 is also coupled through a capacitor C25 to the base of a p-n-p transistor Q38, the emitter of which is grounded and the collector of which is coupled through a resistor R64 to −6 v. as shown. A resistor R63 connects the base of transistor G38 to +5 v. Two output circuits are taken from the collector circuit of the transistor Q38. One of these terminates in a terminal TE7 which is coupled to the reset counter RCO as indicated in FIG. 1, and the other of which, including a resistor R65 and a capacitor C26, in series, terminates in a terminal TE8 which is coupled input-wise to the gate G, as indicated in FIG. 1. When the transistor Q38 is fully conducting the collector circuit is coupled approximately to +5 v., and when the transistor Q38 is at minimum conduction, the collector circuit is coupled to −6 v. through a resistor R64 of suitable ohmic value to provide a collector circuit voltage of approximately −5 v. The characteristic swing of the output voltage of the oscillator is therefore approximately ±5 v., peak to peak.

INTEGRATING AMPLIFIER A2

As described in connection with FIG. 1, the second input terminal TE6 of the voltage controlled oscillator is connected to the output of an amplifier A32 forming part of a correction loop for controlling the voltage controlled oscillator. Correction input terminal TE6 is also coupled to the base of the transistor Q32 by means of a suitable resistor. As will be recalled, this oscillator correction loop includes an integrating amplifier, generally designated A2 which has its input circuit coupled to a terminal TE9 and its output circuit coupled through resistor R5 to a terminal TE9*a*, the termials TE9 and TE9*a* being part of a precision resistor network coupled between the output of the potentiometric amplifier system and a supply of negative reference voltage $-V_{ref}$. The amplifier A2 is controlled by the potential at terminal TE9 which is the difference between the feedback potential and the reference potential as scaled by the precision resistors R1 and R2.

As will be seen by reference to FIG. 5, the terminal TE9 is coupled through resistors R70 and R71 and capacitor C27 to the base of an n-p-n transistor Q40, the collector circuit of which is coupled to a voltage divider comprising resistors R72*a* and R72*b* connected at one end between the common emitter of a p-n-p transistor Q41 and base of an n-p-n transistor Q42 and connected at the other end to +6 v. as indicated. The emitter of transistor Q40 is coupled by a resistor R73 to −6 v. The collector of transistor Q41 is coupled directly to −6 v. Transistors Q42 and Q43, which are n-p-n transistors, form part of a difference amplifier. Their emitters are commonly connected to −6 v. by a resistor R74 and resistors R75 and R76, respectively, connect the collector circuits of these transistors to +6 v. The base of transistor Q43 is connected directly to ground. The collector circuits of this difference amplifier are coupled to the respective bases of n-p-n transistors Q44 and Q45 of a second difference amplifier. The emitters of transistors Q44 and Q45 are connected by a resistor R77 to −6 v. and the collectors are resistor coupled by resistors R78 and R79 to +15 v. as indicated. The collector circuits of the second difference amplifier are coupled to the respective bases of a complementary pair of transistors Q46 and Q47 which are emitter coupled. The collector of transistor Q47 is connected to +15 v. directly and the collector of transistor Q46 is connected by means of a resistor R80 to −6 v. The collector circuit of the transistor Q46 is coupled by resistors R85, R86 and R87 to the resistor R5 and the terminal TE9*a* which in turn is coupled to the input of the filter F. An integrator capacitor C3 couples the terminal TE9*b* back to the input of the amplifier A2 at capacitor C27, as indicated.

The integrating amplifier is designed to produce a linear sawtooth voltage, the period of which, as described in connection with FIG. 1, is controlled by the frequency of the output of the voltage controlled oscillator VCO. As seen in FIG. 1, the switching is accomplished by switches S1 and S2. The specific switches are herein illustrated, switch S1 comprising transistors Q49, Q50 and Q51, and the switch S2 comprising switching transistors Q52, Q53 and Q54. These transistors are inverted in the circuits illustrated, their collectors being grounded and their emitters being connected to the input and output circuits respectively, as indicated. The base of transistor Q49 is coupled in a voltage divider between −6 v. and ground by means of resistors R88 and R89. Similarly, the base of transistor Q50 is connected in a voltage divider between −6 v. and ground by means of resistors R90 and R91. The base of transistor Q51 is grounded through a resistor R91*a*. The bases of all of the transistors Q49 through Q54 of the two switches S1 and S2 are connected to the emitter circuit of an n-p-n transistor Q48 by means of resistors R92 through R97, as indicated.

Transistor Q48 is a switching transistor having its base connected to the terminal $\overline{R}$S11 of the reset flip-flop circuit RFC. Its collector circuit is coupled by a resistor R98 to +15 v. The emitter circuit of transistor Q48 is also coupled to −15 v. by means of a resistor R99. Normally, the transistor is cut off by the voltage state signal $\overline{R}$S11 which in its lower voltage state (about −5 v.) biases the transistor to cutoff. During the periodic positive going excursions (about +5 v.) of the voltage state signal $\overline{R}$S11 the transistor is sharply driven to conduction. Thus, in its conducting state transistor Q48 couples switching voltage to the bases of all of the switching transistors Q49 through Q54.

As will be seen, the emitter of the transistor Q49 is coupled to the left terminal of resistor R70. The emitter of transistor Q50 is coupled to the terminal between resistors R70 and R71 and the emitter of transistor Q51 is coupled to the input capacitor C27 on the input side of the amplifier A2. At the output of amplifier A2 switching transistor Q52 is connected to the terminal beween resisors R85 and R86, the emitter of switching transisor Q53 is connected to the terminal between resistors R86 and R87 and the emitter of switching transistor Q54 is connected to the terminal TE9*b*.

The switching transistors being coupled in the input and output circuits of the amplifier A2, as shown, are effectively coupled to the opposite ends of the integrating capacitor C3. They are separated by the respective resistors indicated, in positions to provide parallel switching paths to ground to distribute the load, speed up the switching action and achieve lower impedance to ground, to provide high speed positive grounding of the opposite ends of the integrating capacitor. Transistors Q55, Q56 and Q57 form part of a trimming network controlled by a trim potentiometer PT1 which is connected between −6 v. and ground, as indicated. The movable tap of this potentiometer is coupled through a resistance circuit directly to the base of the input transistor Q40 and is further resistance coupled to the emitter of the transistor Q55, the collector of which is grounded. The base of transistor Q55 is coupled to the emitter circuit of the switching transistor Q48 and is therefore switched to become conducting each time the emitter circuit of transistor Q48 goes positive. The emitter of transistor Q55 is coupled to the collector of an n-p-n transistor Q56, the emitter of which is grounded through a resistor of low ohmic value. The base of transistor Q56 is connected to the emitter of transistor Q57, the collector of which is grounded and the base of which is resistor-coupled to the emitter circuit of switching transistor Q48. The emitter of transistor Q57 is also resistor-coupled to the collector circuit of transistor Q46 and is clamped above ground potential by the forward voltage drop of a double series diode set represented in the single diode CD, as shown.

During periods when the emitter circuit of the switching transistor Q48 is at the lower of its two voltages, that is, there is no switching pulse on its base, the transistor Q57 is biased to conduction which couples the base of the transistor Q56 directly to ground. Since transistor Q56 is an n-p-n transistor and its emitter is grounded through a resistor, the transistor is now cut off. The tap of trim potentiometer PT1 is adjusted to provide initial biasing for Q40 so that range out of Q55 emitter is proper to keep Q40 at correct bias point. Thus, at the time that switching occurs and transistor Q55 is driven to conduction and transistor Q57 is switched off, the collector circuit voltage of transistor Q46 causes transistor Q56 to conduct charging capacitor C50. When transistor Q48 switches off the capacitor C50 is effectively coupled to the base of transistor Q40 and is filtered by the filter capacitor C51. This adjusts the DC bias on the base of transistor Q40 to keep it in the proper operating range. The wave form at the emitter circuit of transistor Q54, terminal TE9*b* is a sawtooth voltage having an extremely sharp cutoff characteristic without oscillation, as indicated. The voltage swing at the output circuit for this embodiment of the invention for the parameters chosen is approximately of the order of 8 to 10 volts. Using a 10 flip-flop counter and reset flip-flop as shown the frequency of switching of the integrator is approximately 150 cycles per second when the input voltage to the voltage to frequency converter is at zero voltage. For a maximum positive input voltage the switching frequency of the integrator is approximately 75 cycles per second, and for a maximum negative input voltage the switching frequency is approximately 225 cycles per second. In another application employing a counter having 9 flip-flops, the respective frequencies were 300, 150 and 450 cycles per second.

AMPLIFIER A31

After filtering, the output of the integrating amplifier is coupled to the input of an amplifier A31, which for the purposes of this discussion may be considered to be the same as the amplifier A11 which has previously been discussed, with the exception that the base of the transistor Q7 is now coupled to the terminal TE4 and the collector of transistor Q7 is grounded and with the additional exception that the transistor Q15 is a p-n-p transistor which clamps the output to ground and provides output of opposite phase to that of amplifier A11.

AMPLIFIER A32

The output of the amplifier A31 is coupled input-wise to an amplifier A32. The details of this amplifier are shown in FIG. 6. The input circuit of this amplifier includes coupling resistors R66 and R67 connected in series to the base of an n-p-n transistor Q60 forming one transistor of a difference amplifier including a second n-p-n transistor Q61 having a grounded base. The common emitters of the transistors of this difference amplifier are coupled by a resistor R68 to −5 v. and the collector circuits are coupled by respective resistors R69*a* and R69*b* to +5 v. The collector circuit of the transistor Q60 is connected to the base of a p-n-p transistor Q62, the emitter of which is connected to +5 v. by resistor R81 and the collector of which is connected to −5 v. by a resistor R82. The collector circuit of this latter transistor is connected directly to the base of a transistor Q63 connected across the power supply by resistors R83*a* and R83*b* in the collector and emitter circuits, respectively. The emitter circuit of this transistor is also grounded through a resistor R83*c*. The collector circuit is coupled to the base of the input transistor Q60 by means of a capacitor C4 completing a feedback loop. The output resistor R84 connects the collector circuit of the output transistor of this amplifier to the terminal TE6 which is the correction input terminal of the voltage controlled oscillator. The regulation afforded by this loop is done at a very low frequency as compared with the normal operating frequency of the oscillator which is desirable. Inasmuch as the circuits are designed for substantially 99 percent linearity is achieved in the direct coupling and conversion of voltage to frequency by the potentiometric amplifier system and voltage controlled oscillator, the amount of correction required in this feedback loop is minimal, of the order of about 1 percent, which minimizes the regulation problem.

FREQUENCY DIVIDER FD

As noted hereinabove, the frequency divider includes a conventional 10 flip-flop binary type of counter. The flip-flops of such a counter may be of any conventional type. In this connection reference may be made to page 126 of a book entitled "Logic Design of Digital Computers," by Montgomery Phister, Jr., which describes a standard J–K type of flip-flop. The truth table for such a flip-flop is reproduced below for convenience.

| $J^n$ | $K^n$ | $Q^{n+1}$ |
|---|---|---|
| 0 | 0 | $Q^n$ |
| 0 | 1 | 0 |
| 1 | 0 | 1 |
| 1 | 1 | $\overline{Q^n}$ |

Such a flip-flop includes two input circuits and when a switching signal is applied to the K side of the flip-flop the flip-flop is switched to its "0" representing electrical state. When a switching signal is applied to the J input terminal of the flip-flop the flip-flop is switched to its "1" representing electrical state. When an input switching signal is applied simultaneously to both input terminals of the flip-flop, the flip-flop changes its electrical state, that is, if it is in its "1" representing electrical state it switches to its "0" representing electrical state.

Further reference to transistor types of flip-flops is made in a book entitled "Digital Computer Components and Circuits," by R. K. Richards, with particular reference to page 161, FIG. 4–12*a*.

As earlier described herein, such flip-flops may be connected in cascade to form a conventional binary counter by connecting one output terminal of a flip-flop to both input terminals of the next higher order flip-flop and so on to complete the counting chain.

Inasmuch as the reset flip-flop involves some special circuits, this flip-flop has been illustrated in FIG. 7. The flip-flop therein illustrated comprises a pair of controlled switching transistors of the p-n-p type, designated Q65 and Q66, the collector and base circuits of which are cross-connected by means of the cross-coupling networks N1 and N2, as indicated, each of which comprises a parallel connected resistor and capacitor. The common emitters of these two transistors are connected by resistor R101 to +15 v. The collector circuits of transistors Q65 and Q66 are further connected to the respective collector circuits of a pair n-p-n transistors Q67 and Q68, the emitters of which are connected to —15 v. through a resistor R102. The collectors and bases of these last two transistors are cross-coupled by means of the cross-coupling networks N3 and N4, as shown. The bases of transistors Q65 and Q67 are connected by a coupling network N5. A resistor R104 connects the base of transistor Q65 to +15 v. and a resistor R106 connects the base of transistor Q67 to —15 v. Coupling network N6 is connected between the bases of transistors Q66 and Q68 and these bases are connected to +15 v. and —15 v., respectively, by resistors R105 and R107. The base of transistor Q66 is further coupled to the collector circuit through a resistor R100 and a diode poled to apply positive going voltages to the base. The base of transistor Q65 is coupled to and controlled by the collector of a p-n-p switching transistor Q69, by a circuit including a resistor R109 and the indicated diode. This collector circuit of transistor Q69 is also coupled to the emitter circuits of the transistors Q67 and Q68 and to —15 v. through the resistor R102. The emitter circuit of transistor Q69 is connected to +15 v. by resistor R101. Inasmuch as either one of transistors Q67 and Q68 will be conducting for the different states of the flip-flop, a predetermined emitter voltage exists determined by the parameters of the particular circuit. This voltage amounts to about —5 v., and being coupled to the base of transistor Q65 through the resistors R108 and R109 and the series diode, biases the transistor Q65 to conduction. When transistor Q65 conducts transistor Q66 is cut off. The cross-coupling networks now impose a positive going voltage to the base of transistor Q68 and this transistor conducts. When transistor Q68 conducts the output terminal $\overline{\mathbf{RS11}}$ is at the lower of its two voltage states. Thus, the flip-flop is always initially set by the internal fixed biases indicated so that the terminal $\overline{\mathbf{RS11}}$ is maintained in its lower voltage state. The base of transistor Q69 is coupled between a pair of resistors R110, R111 connected in series with a transistor Q70 forming part of a transistor gate. This series circuit is connected between +15 v. and ground.

Transistor Q70 is an n-p-n transistor having its collector connected to the resistor R111 and its emitter connected directly to ground. The control network for the base of transistor Q70 comprises input resistors R112, R113, R114 and R118 each of which has one end connected to the base. The remaining end of resistor R118 is connected to +15 v. The remaining ends of the other resistors are connected to flip-flop terminals $\overline{\mathbf{RS8}}$, $\overline{\mathbf{RS9}}$ and RS10. At such time as all of the input signals $\overline{\mathbf{RS8}}s$, $\overline{\mathbf{RS9}}s$ and $\overline{\mathbf{RS10}}s$ are in the higher of their two voltage states conduction of transistor Q70 takes place. When transistor Q70 conducts the base of transistor Q69 is pulled below the emitter potential and conduction takes place. At this time the collector voltage rises and raises the base potential of transistor Q65 sufficiently to cause cut off. When this occurs the conducting states of the transistors are reversed and transistors Q66 and Q67 become conducting. At this time the potential of the collector circuit represented in the output $\overline{\mathbf{RS11}}$ switches from some lower potential to some higher potential.

The transistor is switched back at this point by the signal $\overline{\mathbf{RS7}}$. A timing diagram depicting the relationships of all of these signals appears in FIG. 8. As will be seen by reference to FIG. 7, the signal $\overline{\mathbf{RS7}}$ is coupled by means of a diode to the base of a p-n-p switching transistor Q71, the emitter of which is grounded through a diode and the collector of which is coupled to —15 v. through a resistor R115. Resistor R117 couples the base to —15 v. A collector circuit is further connected to ground through a resistor R116 forming a voltage divider network for the collector. The resistors R115 and R116 may be of about the same ohmic value so that the collector circuit may be normally at about —7½ v. The collector circuit is also coupled by capacitors C28 and C29 to the bases of the flip-flop transistors Q65 and Q66. Thus, after the flip-flop has been switched so that transistors Q66 and Q67 are conducting, as described, so that the output signal $\overline{\mathbf{RS11}}$ is in the higher of its two voltage states, the next negative going excursion of the signal $\overline{\mathbf{RS7}}s$ switches the transistor Q71 to conduction and the collector circuit switches toward ground potential. Since the collector voltage of transistor Q69 is still high this positive going voltage excursion is coupled by the respective capacitors C28 and C29 to the bases of the transistors Q65 and Q66, the positive going excursion cutting off the transistor Q66 and switching the flip-flop back to its initial state in which the signal $\overline{\mathbf{RS11}}$ is in the lower of its two voltage states, as indicated. By examination of FIG. 8 it will be seen that at any time the signals $\overline{\mathbf{RS7}}$ through $\overline{\mathbf{RS10}}$ switch simultaneously to the higher of their two voltage states the output signal $\overline{\mathbf{RS11}}$ is switched from the lower of its two voltage states to the higher of its two voltage states. For instance, at times T0 and T1 and with the next negative going excursion of the signal $\overline{\mathbf{RS7}}$ and the switching action provided by transistor Q71, the flip-flop is switched back to the lower of its two voltage states. As described, the signal $\overline{\mathbf{RS11}}$ switches the transistor Q48 to reset the integrator amplifier illustrated in FIG. 5 and as described in connection with FIG. 1.

VOLTAGE TO FREQUENCY CONVERTER

Embodiment No. 2

A second embodiment of the voltage to frequency converter is illustrated in FIG. 9. In this figure parts corresponding to those illustrated in FIG. 1 have been given like reference characters and the function of these parts will be understood in connection with the description concerning FIG. 1, and also in connection with the specific description of these parts in the several detailed circuits, FIGS. 2 through 8, inclusive. The circuit illustrated in FIG. 9 includes an amplifier system A11 and A12 and a voltage controlled oscillator VCO as in FIG. 1. In this figure, however, the output of the voltage controlled oscillator is no coupled input-wise to a pulse generator which may be any conventional type of pulse generator and which is generally designated PG. The output of the pulse generator PG is coupled in a feedback loop including a series calibrating resistor and an integrating amplifier A21 of conventional design. The output of integrating amplifier A21 is coupled to the collector at terminal TE3 of the chopper or modulating transistor of amplifier A11 as in the circuit earlier described. A second feedback loop includes the resistor network R1, R2 coupled in series between the output of amplifier A21 and a negative reference voltage $-V_{ref}$. The common terminal TE9 of resistors R1 and R2 is connected input-wise to integrating amplifier A2 which is switched as before by means of the switches S1 and S2 controlled by the frequency divider FD, in turn controlled by the output of the voltage controlled oscillator VCO. The output of the integrating amplifier A2 at terminal TE9*b* is coupled via resistor R5 to the common terminal TE9*a* of resistors R3 and R4 connected in series between the output of amplifier A21 and the negative reference voltage $-V_{ref}$. This common terminal TE9*a*, after filtering (not shown), is coupled input-wise to an amplifier which may be an amplifier system such as the amplifiers A31 and A32 of FIG. 1, and the output of this amplifier system is coupled to the pulse generator PG to control the pulse generator.

From an inspection of the circuit thus far described it will be apparent that a primary difference between this circuit and that of FIG. 1 is the use of a pulse generator in the feedback loop controlling the voltage controlled oscillator, which pulse generator is controlled by the output of the voltage controlled oscillator to generate a feedback voltage, and, that a second control loop, including amplifier A2, is controlled by this feedback voltage and is utilized to control the pulse generator.

The corrective loop around the pulse generator PG and the integrating amplifier A21 is designed to correct for any drift or nonlinearities in the frequency to voltage conversion existing between the pulse generator and the integrating amplifier. In accomplishing this the output voltage, which is essentially a pure DC voltage from the integrating amplifier A21, is coupled to the input circuit of the integrating amplifier A2 which is a virtual ground point. Capacitor C3 coupled from the output circuit to the input circuit of the amplifier A2 is a good quality capacitor and as before is arranged with suitable switches S1 and S2 to ground the output and input thereof after a period of time determined by the frequency divider FD. The output of amplifier A2 is averaged and compared with the reference voltage $-V_{ref}$ and then coupled into amplifiers A31–A32, the output of which corrects the operation of the pulse generator.

For the purpose of this explanation, assume an input voltage of $-1$ v. to the input voltage circuit I. The input amplifier system will cause the voltage controlled oscillator frequency to shift until the feedback voltage is equal to or substantially equal to the input voltage. As the feedback voltage changes and approaches $+1$ v. this causes a smaller absolute magnitude of current to be applied to the integrating amplifier A2 and the slope at its output will be correspondingly less volts per second. However, assuming no errors to correct, the frequency divider FD takes a correspondingly longer period at this lower oscillator frequency before it operates the switches S1 and S2 to reset the capacitor C3. Consequently, the volt-second area of amplifier A2 remains equal to some average DC voltage which is compared with the reference voltage $-V_{ref}$.

The operating characteristics are depicted in FIG. 10. Here, the area No. 2 is proportional to the input frequency and the area No. 1, the reset time, is independent of frequency. This indicates that as the frequency changes the average DC voltage out of amplifier A2 would tend to remain constant if the area No. 2 were the only output. Since area No. 1 is independent of frequency, as the frequency increases the average DC voltage will increase proportionally. This may be compensated by an exact equal current from the feedback voltage point, that is, the output of amplifier A21. Assume that the pulse generator wave shape drifts and gives a more positive DC output voltage for the same input frequency. This results in less current into the integrating amplifier A2 and the output area No. 2 will be less volt-second of area and will feed an error signal into amplifier A31–32. The output of this amplifier now alters the shape of the pulses generated by the pulse generator PG in a sense tending to establish the correct ratio of frequency to DC voltage. If the reset time for capacitor C3 is made infinitely short then the area No. 1 will approach zero and the compensating resistor R3 will not be required. Thus, by regulating the pulse generator PG to control the pulse shape, the average DC in the feedback loop, i.e., at the output of amplifier A21, may be regulated to provide the precise output frequency required by the instant input voltage.

This voltage to frequency converter may be coupled to a digital system as in FIG. 1 and may be utilized as a digital voltmeter in the same manner.

VOLTAGE TO FREQUENCY CONVERTER

Embodiment No. 3

A further modification of the system may be obtained by decoupling or disconnecting the output of the amplifier A12 from the input circuit of the voltage controlled oscillator at terminal TE5. The behavior of the system will remain essentially unchanged excepting that now the entire drive energy for the voltage controlled oscillator VCO is supplied by the output of amplifier A32 instead of just the regulating energy.

DIGITAL SYSTEM

Timer counter TC

The digital portion of the system is illustrated in greater detail in FIG. 11. Here, the timing counter TC is divided into several sections to illustrate the points in the counter from which the several signals are derived. This timing counter includes a group of fourteen flip-flops. The first thirteen of which are arranged in a conventional cascade interconnection to provide straight binary switching and counting. The flip-flops in this counter may be of the type referred to hereinabove, particularly with reference to page 128 of "Logical Design of Digital Computer," Montgomery Phister, Jr., which describes the convention J–K flip-flop and also with reference to page 161 of "Digital Computer and Circuitry," by R. K. Richards, FIGS. 4–12*a*. As indicated, the output of the crystal oscillator XO is coupled input-wise to the J–K input terminals of the first flip-flop FT1 of the timing counter TC. The first signal which is taken from the timing counter is a signal T5*s* derived from the terminal T5 of the flip-flop FT5. Terminal $\overline{T5}$ of the latter flip-flop is coupled input-wise to the J–K input terminals of flip-flop FT6 which is similarly interconnected through flip-flops FT7 and FT8 in the block shown to provide an output at terminal $\overline{T8}$. Terminals T5 and $\overline{T8}$ are commonly connected by means of diodes D6 and D7 having common cathode circuits and the terminal, $\overline{T8}$ is further connected input-wise to the J–K input terminals of the next higher order stage flip-flop FT9. Terminal $\overline{T8}$ is further coupled to the output drive circuit DR1 which, as will be described, drives the input circuit of the programmer. The output circuit of flip-flop FT10 is commonly connected input-wise to the J–K input terminals of a flip-flop FT11. Similar interconnections continue among the flip-flops FT11 through FT13. Output terminals $\overline{T13}$ is coupled input-wise to the K input terminal of a flip-flop T14 which constitutes the output flip-flop of the timing counter. Terminal $\overline{T10}$ is coupled input-wise to the J input terminal of flip-flop FT14.

Reference to FIGS. 12 and 13 may be made for typical output signals from the several output terminals of the timing counter which are utilized for drive and control purposes. The signals therein shown include the signal T5*s*, the signal $\overline{T8}$*s*, the signal $\overline{T10}$*s*, the signal $\overline{T13}$*s* and the signals T14*s* and $\overline{T14}$*s*. The drawing depicts the time phase relationships of the several signals for a selected period of time covering the operating cycle of the timing counter from just prior to the end of the count interval through the operating period to the beginning of the next count interval.

As will be seen from an inspection of FIG. 12, for instance, just prior to the end of the count interval the signal $\overline{T14}$*s* switches from the lower of its voltage states to the higher of its voltage states. The voltage state herein illustrated merely showns a negative voltage level for the lower of the voltage states and a zero or ground voltage level state for the higher of the two voltage states. Any other suitable voltage range may be selected depending upon the characteristics of the system.

With switching of the signal $\overline{\text{T13}}$ to the higher of its two voltage states the positive going input on the K input terminal of flip-flop FT14 switches this flip-flop to its "0" representing state in which the output voltage $\overline{\text{T14}}s$ is in the higher of its two voltage states and the output voltage T14*s* is in the lower of its two voltage states as illustrated. Since the terminal $\overline{\text{T10}}$ is coupled to the J input terminal of flip-flop FT14, the next positive going voltage excursion of the signal $\overline{\text{T10}}s$ coupled to the J input terminal of the flip-flop FT14 switches this flip-flop to its "1" representing electrical state in which the voltage T14*s* is in the higher of its voltage states as illustrated. This occurs just prior to occurrence of the new count interval as shown in FIGS. 12 and 13.

PROGRAMMER P

The output signals T14*s* and $\overline{\text{T14}}s$ are utilized for control purposes in the system. To this end the terminals T14 and $\overline{\text{T14}}$ are coupled by resistors R128 and R129 to the anodes of diodes D14 and D15 in the J and K input circuit, respectively, of a programmer flip-flop FPO as illustrated. The programmer flip-flops include additionally the flip-flop FP1, the flip-flop FP2 and the flip-flop FP3, all of which may be the conventional type of flip-flop referred to hereinabove. The voltages T14*s* and $\overline{\text{T14}}s$ now operate as enabling voltages on the input circuits of programmer flip-flop FPO.

The drive circuit DR1 from the timing counter TC is coupled by a resistor-capacitor network N7 to the base of a p-n-p transistor Q74. The base circuit is further coupled to +15 v. through a resistor R125. A resistor R126 couples the collector circuit of this transistor to −15 v. and the emitter circuit is directly grounded. Resistor R127 couples the collector circuit to ground. The collector circuit of transistor Q74 is connected to capacitors C30 and C31 which are each connected in series in the J and K input circuits, respectively, of the flip-flop FPO. These flip-flops, as well as other flip-flops in the system, are operated by sharp positive going voltages on their input circuits. Positive going voltages having a long rise time are ineffective to cause switching of these flip-flops. Thus, at such time as the signals T14*s* and $\overline{\text{T14}}s$ switch from the lower of their two voltage states to the higher of their two voltage states, the delay in voltage rise to the input to the flip-flops resulting from the resistors R128 and R29 prevents flip-flop triggering. At such time as the voltage T14*s* is in the higher of its two voltage states the J input circuit of the flip-flop FPO is enabled. When the signal $\overline{\text{T14}}s$ is in the higher of its two voltage states the K input circuit of this flip-flop is enabled.

Flip-flop FPO controls the transistor gate G. This transistor gate includes p-n-p transistor Q72 having a grounded emitter and having a collector circuit connected to −15 v. by means of a resistor R120. The base circuit of this transistor is connected to −15 v. by a resistor R123 and is further connected to ground through a clamping diode D11. As illustrated in FIG. 1, the terminal TE8, which in this illustration is coupled to the base of transistor Q72, is one output terminal of the voltage controlled oscillator. Thus, the output of the voltage controlled oscillator drives the base of this transistor. A second p-n-p transistor has its emitter circuit grounded by a diode D13 and has its collector circuit connected to −15 v. by a resistor R122. The base circuit of this transistor is connected to the terminal $\overline{\text{PO}}$ of the programmer flip-flop FPO by means of a diode D12. A resistor R121 couples the base circuit to −15 v. The output of the collector circuit of input transistor Q27 of this transistor gate is coupled to the base circuit of transistor Q73 by means of a diode D10.

When the output terminal $\overline{\text{PO}}$ is in the lower of its two voltage states the diode D12 effectively decouples the terminal $\overline{\text{PO}}$ from the base of transistor Q73 and the output signals of the collector circuit of flip-flop Q72 now control the transistor Q73 switching it synchronously with the voltage excursions of the voltage controlled oscillator VCO. When the output terminal $\overline{\text{PO}}$ is in the higher of its two voltage states, i.e., about ground potential, the transistor Q73 is cut off and the voltage excursions of the collector circuit of transistor Q72 do not effect switching of transistor Q73. As shown, the output of the collector circuit of transistor Q73 is coupled to the input of counter CO. The input, as illustrated in FIG. 14 hereinafter, being the J–K input terminals of the lowest order flip-flop FCO1 of the 10° decade of the counter.

The switching cycle or period of the flip-flop FPO is illustrated in FIGS. 12 and 13. Inasmuch as this flip-flop is controlled by the signals T14*s* and $\overline{\text{T14}}s$, it switches only after an enabling potential is coupled to one of its two illustrated input circuits. Switching is effected by the signal $\overline{\text{T8}}s$. Because of the control afforded by the signal $\overline{\text{T14}}s$ and T14*s* the flip-flop FPO is normally in its "1" representing voltage state during the count interval in which the output terminal PO is in the higher of its two voltage states and is in its "0" representing electrical state during the operating interval in which the terminal PO is in the lower of its two voltage states. Thus, at such time as the signal $\overline{\text{T14}}s$ switches to the higher of its two voltage states the K input circuit of the programmer flip-flop FPO is enabled. The next negative excursion of the signal $\overline{\text{T8}}s$ drives the input transistor Q74 of the programmer to conduction. The collector circuit now switches from some negative potential to approximately ground potential and the positive going excursion coupled by capacitor C31 on top of the voltage state signal $\overline{\text{T14}}s$ on the K input circuit now applies a sharp positive going potential to the K input circuit to switch flip-flop FPO to its "0" representing electrical state in which the terminal $\overline{\text{PO}}$ is high. This disables the gate and prevents counting the output frequency of the voltage controlled oscillator VCO during the operating period. Thus, the program flip-flop FPO determines the end of the count interval which is indicated in FIGS. 12 and 13. When the signals $\overline{\text{T14}}s$ and T14*s* reverse their electrical states with the occurrence of the next positive going excursion of signal $\overline{\text{T10}}s$, the next negative going excursion of signal $\overline{\text{T10}}s$ switches the flip-flop FPO from its "0" to its "1" representing electrical state which now determines the beginning of the next count interval is indicated.

The flip-flop FP1 of the programmer is primarily a control flip-flop. The output terminal $\overline{\text{PO}}$ is coupled by a capacitor C32 to the J input terminal of flip-flop FP1. Thus, at the end of a count interval when the terminal $\overline{\text{PO}}$ switches to the higher of its two voltage states a switching pulse is coupled to the J input terminal of the flip-flop FP1 which switches this flop-flop to its "1" representing electrical state in which the terminal P1 is in the higher of its two voltage states. The K input terminal of flip-flop FP1 is coupled by means of a capacitor C33 to the $\overline{\text{P3}}$ terminal of a programmer flip-flop FP3 and is controlled thereby so that each time the terminal $\overline{\text{P3}}$ switches to the higher of its two voltage states a switching pulse is coupled to the K input terminal of flip-flop FP1 switching this flip-flop to its "0" representing electrical state in which the terminal $\overline{\text{P1}}$ is in the higher of its two voltage states. The output terminal P1 of the flip-flop FP1 is coupled along with the terminal P3 by means of diodes D20 and D21 to the input circuits of the reset section RS of the shift reset generator SRG. The output terminal $\overline{\text{P1}}$ is coupled by a resistor R132 to the cathode of a diode D17 in the K input circuit of a flip-flop FP2 including additionally in series therein a coupling capacitor C35. When the terminal $\overline{P1}$ is in the higher of its two voltage states the diode D17 is back-biased and effectively decouples the collector circuit of input transistor Q74 from the input of flip-flop FP2. Terminal $\overline{P1}$ is further coupled by a resistor R131 and a resistor R133 in series therewith to the cathode of a diode D18 which cathode is further coupled by capacitors C36 and C37 to the respective input terminals J and K of the flip-flop FP3. The anode of diode D18 is coupled to the collector circuit of input transistor Q74. Terminal $\overline{P1}$ in the higher of its two voltage states thus also back-biases diode D18, decoupling both input circuits of flip-flop FP13 from the collector circuit of the input transistor Q74. Output terminal P2 of flip-flop FP2 is coupled by means of a diode D19 through the resistor R133 to the cathode of diode D18. Hence, when terminal P2 is in the higher of its two voltage states input signals to the flip-flop FP3 are inhibited. Terminal $\overline{P2}$ of flip-flop FP2 is coupled to a diode D16, the cathode of which is coupled via resistor R130 to the terminal PO of flip-flop FPO. The cathode is also coupled input-wise to the least significant flip-flop of the 10° decade of the counter CO as illustrated in FIG. 14, yet to be described, and is used for the purposes of adding one count to the counter when the input stored in the counter is to be transferred directly to the memory and read-out circuits as will be described at a later point. The output terminal $\overline{P3}$ is commonly coupled to the anode of diodes D26 and D28, respectively, forming a part of diode gating circuits in the input circuits of the shift direct SD and shift nines complement SN sections of the shift reset generator SRG.

SHIFT RESET GENERATOR SRG

The shift reset generator, as its name implies, is utilized for the purpose of shifting the count in the counter CO to the memory and read-out circuits. All such shifting operations take place at the end of each count interval during the operating period of the system. Consequently, the shift reset generator SRG must be completely disabled during the count interval. The count interval exists during the period when the signal T14 of the output flip-flop FT14 of the timer counter is in the higher of its two voltage states.

Disabling is accomplished by coupling the terminal T14 through a diode D8 to the drive circuit DR2. At any time the terminal T14 is in the higher of its two voltage states the excursions of the signal T5 between its two voltage states are ineffective to control the base of input p-n-p transistor Q80 of the shift reset generator. Drive circuit DR2 is coupled to a terminal TE19, in turn coupled to the cathode of a diode D9, the anode of which is directly coupled to the base of transistor Q80, the emitter of which is grounded. The collector circuit of transistor Q80 is resistor coupled to −15 v., as is the cathode of diode D9 as shown. The collector circuit is further coupled to ground through a resistor and thus is in a voltage divider network normally maintaining the collector circuit at a negative potential whenever the transistor Q80 is cut off.

The resistor voltage divider coupling the base circuit between ground and −15 v. in the absence of other biases drives the transistor Q80 to conduction, coupling its collector circuit approximately to ground and maintaining ground potential on the anode of diode D24 at the terminal TE10. At such time as the signal T14*s* is in the lower of its two voltage states and the signal $\overline{T8}$*s* is in the lower of its two voltage states the signal T5*s* is effective to control switching of input transistor Q80, the transistor being switched off with each positive going excursion of signal T5*s*.

The circuit SD is typical also of the circuit SN and the description of circuit SD will therefore suffice for both circuits. This circuit includes an input transistor, generally designated Q75, having an emitter circuit coupled to ground through a diode D23. This is a p-n-p transistor and requires a base potential below the emitter potential for conduction to take place. The base circuit is connected to the common cathode circuits of gate diodes D24, D25 and D26. Diodes D24 and D26 have been described. Diode D25 couples the output circuit of the gate to a terminal $\overline{C5}$–2 of a flip-flop FC5 of the $10^5$ or polarity decade of the counter yet to be described. This terminal, when in the higher of its two voltage states, indicates that the counter has not been driven over its upper range, in which case it is desirable to inhibit transfer of the input in the counter to the memory and read-out circuit. When the potential on all of the anodes of diodes D24, D25 and D26 are low, the transistor Q75 is switched to conduction. Its collector circuit is coupled by a resistor R135 to the base of a second transistor Q76 which is an n-p-n transistor having its emitter coupled to −15 v. and its collector coupled to ground through a resistor R139. The base of transistor Q76 is also coupled to −15 v. through a resistor R136. The collector of transistor Q76 is also coupled to the base of an n-p-n transistor Q77 having a grounded collector. A clamping diode couples the emitter of the transistor to its base and the base is further connected to +15 v. through a resistor as indicated. The clamping diode forces the emitter of transistor Q77 to follow the base. With the biasing arrangement indicated transistor Q77 is normally conducting when transistors Q75 and Q76 are cut off.

Assuming that the input voltages to all of the gate diodes D24, D25 and D26 are low, transistor Q75 is switched to conduction. The resulting positive going excursion of the base of transistor Q76 drives this transistor to conduction which now effectively couples the base of transistor Q77 to −15 v. This cuts off transistor Q77 so that its output voltage at its emitter circuit swings from about ground potential to some predetermined negative potential. As will be seen from reference to FIG. 12, the signal SD*s* is normally in the higher of its two voltage states and then switches negatively. This occurs when the transistor Q77 is cut off. The signals at terminals TE19 and TE10 are also illustrated in FIG. 12. Whenever the signal T14 is in the lower of its two voltage states the signal TE19*s* will follow the switching characteristics of the signal T5*s* each time the signal $\overline{T8}$*s* is in the lower of its two voltage states. The signal at terminal TE10 which is in the collector circuit of the transistor Q80 is inverted with respect to the signal TE19*s*. Thus, the signal SD*s* is switched low each time the signal TE19*s* swings positive to cut off the transistor Q80. With the final positive going excursion of the signal TE19*s* during the interval when $\overline{T8}$*s* is low the transistor Q77 is cut off. Thus, the signal SD*s* remains in the lower of its voltage states until the next negative going excursion of the signal $\overline{T8}$*s* at which time the signal SD*s* again goes positive. At this point, as will be seen by reference to FIG. 12, the flip-flop FP3 is switched and the terminal $\overline{T3}$ goes to the higher of its two voltage states. This inhibits the gate controlling transistor Q75 which now remains cut off so that the transistor Q77 remains conducting.

The circuit SN which enables shifting of the nines complement of the number stored in the counter is illustrated in block form but will be construed from the circuit SD. The circuit SN is controlled by a gate including diodes D27, D28 and D29 having common cathodes. Diode D28 couples the signal $\overline{P3}$ and diode D29 is coupled to the terminal TE10, i.e., the collector circuit of the input transistor Q80. Diode D27 couples a signal C5–2 which is the other output terminal of flip-flop FC52 mentioned in connection with the circuit SD. When this signal is high it indicates that the counter is in its higher input range and when it is low it indicates that the counter is in its lower range which requires shifting the nines complement. FIG. 13 illustrates this condition showing the characteristics of the signal SN*s*, the shift nines complement signal, which effects transfer of the nines complement.

The reset circuit RS comprises an input transistor Q78 having a collector circuit coupled to the base of the n-p-n output transistor Q79 by means of a resistor R143. A resistor R140 also couples the base of transistor Q79 to −15 v. Resistor R141 connects the emitter to −15 v. and the collector circuit of this last named transistor is directly grounded. The base circuit of the transistor Q78 is controlled by a gate including a diode D22 which couples the collector circuit (terminal TE10) of transistor Q80 to the base of transistor Q78, and diodes D20 and D21 which couple the terminals P1 and P3, respectively, to the base of transistor Q78. When each of these voltages is low the bias on the base of transistor Q78 causes conduction which couples a switching voltage to the base of transistor 79 causing it to conduct. The emitter circuit is thus coupled approximately to ground potential and is in the higher of its two voltage states. This condition exists during a count interval during which time the signals P1 and P3 are low and the signal T14*s* is high and which being high holds transistor Q80 cut off so that the terminal TE10 is in the lower of its two voltage states. As will be seen by reference to either of FIG. 12 or 13, when signal T14*s* switches to the lower of its two voltage states the terminal TE19 switches low with the next simultaneous negative going excursion of the signals $\overline{T}5s$ and $\overline{T}8s$ and then cycles briefly as shown. The resulting positive going excursion of a potential at terminal TE10*s*, which is coupled to the diode D22, cuts off transistor Q78, cutting off transistor Q79, and the reset signal RS*s* switches to the lower of its two voltage states. Since the flip-flops FP0 and FP1 are now simultaneously switched, as earlier described, by the negative going excursion of the signal $\overline{T}8s$, the circuit RS is held in its present electrical state. During this interval the flip-flop FP3 will have been switched to its "1" representing state with terminal P3 in the higher of its two voltage states. This has no effect on the reset circuit which remains in the lower of its two voltage states. When the signals P1*s* and P3*s* again switch low, as shown in either of FIG. 12 or 13, the next negative going excursion of the signal TE10*s* switches transistor Q78 so that it conducts and the output signal RS*s* now switches to the higher of its two voltage states and switches synchronously with the voltage excursion at terminal TE10. This switching operation terminates when the signal T14*s* switches to the higher of its two voltage states inhibiting the input circuit of the transistor Q80.

COUNTER CO

The counter circuit CO comprises four decades, each of which includes four interconnected flip-flops. The decades are interconnected so that an output signal is produced by a lower order decade and coupled into the least significant flip-flop of the next higher order decade each time the lower order decade cycles from its maximum count and starts to count over again. Two typical counting decades are illustrated in FIG. 14 where the flip-flops are shown only in block form. Typical flip-flops are shown in FIGS. 16 and 17 in detail, FIG. 16 illustrating the least significant flip-flop of each counter decade, and FIG. 17 typically representing the remaining three flip-flops of each counter decade. Actually, the flip-flops of the $10^1$ decade and the higher order decades may be simplified by the elimination of the flip-flop section comprising the two n-p-n transistors in each of FIGS. 16 and 17. Such simplified flip-flops appear in FIG. 18, for instance, yet to be described. The flip-flops in FIGS. 16 and 17 are high speed flip-flops and the lower speed circuits may be simplified by eliminating the two indicated transistors from the circuits and by using lower quality parts. However, for the purpose of this discussion it may be assumed that flip-flops of the type of FIGS. 16 and 17 appear in all states of the counter.

FIG. 15 graphically depicts the switching sequences of the flip-flops in the $10^0$ decade of the counter. This sequence is typical for all of the decades $10^0$ to $10^4$. The switching sequence depicts coding in the excess three code in which the decimal zero digit is represented by 0011 in binary notation, and the decimal digit 9 is represented by 1100 in binary notation. The first binary number normally represents the decimal number 3 and the second binary number normally represents the decimal number 12 when the weights 8, 4, 2, 1 are assigned to the respective binary places, in keeping with conventional practice. Since each binary number, according to the ordinary convention, represents a decimal number which is 3 larger than that assigned herein the significance of "excess 3" with reference to the binary code convention adopted herein will be appreciated.

The flip-flop of FIG. 16 comprises a pair of switching transistors Q87 and Q88 of the p-n-p type which are connected in common emitter configuration. Clamping diodes D35 and D36 clamp the bases to ground. The collector circuits of each of these transistors are respectively commonly connected to the collectors of respective n-p-n transistors Q89 and Q90, the emitter circuits of which are commonly connected by a resistor R155 to −15 v. The collector and base circuits of the first transistor pair are conventionally cross-coupled by resistor-capacitor networks designated N8 and N9, respectively. Similarly, cross-coupling networks N10 and N11 cross-couple the collectors and bases of the second transistor pair. Networks N12 and N13 interconnect the networks N8, N10 and N9, N11, respectively, to couple the collectors of the first transistor pair to the opposite bases of the second transistor pair. The flip-flop illustrated is identified FCO1 which is the least significant flip-flop of the $10^0$ decade, that is, the first stage or decade of the counter. The output terminals which are coupled to the collector circuits of the transistors of this flip-flop are designated CO–1 and $\overline{\text{CO}}$–1.

This flip-flop is of the two input circuit type and for this purpose the "1" setting input circuits are identified by a reference character including the letter "J," and the "0" setting input circuits are identified by a reference character including the letter "K." Thus, all "J" input terminals are coupled to the base of transistor Q88, and all "K" input terminals are coupled to the base of transistor Q87. The flip-flop is in its "1" representing electrical state when the terminal CO–1 is in the higher of its two voltage states and the flip-flop is in its "0" representing electrical state when the terminal $\overline{\text{CO}}$–1 is in the higher of its two electrical states. Input terminal "J" is coupled by a capacitor C38 to the anode of a diode D33 forming part of a steering voltage circuit including a resistor R159 coupled between the collector circuit $\overline{\text{CO}}$–1 and the base of transistor Q88. Similarly, input terminal J1 is coupled by a capacitor C39 to the anode of a diode D34 in a steering voltage circuit including a resistor R158 connected between collector circuit $\overline{\text{CO}}$–1 and the base of a transistor Q88. Reset terminal $R_j$ is coupled by a diode $D_r$ to the base of transistor Q88. Input terminal K is coupled by a capacitor C40 to the anode of diode D31 in a steering voltage circuit including a resistor R156 connected between the collector circuit CO–1 and the base of transistor Q87. Input terminal K1 is coupled by a capacitor C41 to the anode of a diode D42 forming part of a steering voltage circuit including a resistor R157 connected between the collector circuit CO–1 and the base of transistor Q87. The bases of transistors Q87 and Q88 are additionally connected to +15 v. by resistors R160 and R161, respectively. The bases of transistors Q89 and Q90 are additionally connected to −15 v. by resistors R162 and R163, respectively.

This circuit is normally set into its "1" representing electrical state by the application of a positive going voltage to the input terminal $R_j$. Such a voltage cuts off transistor Q88, if it is conducting, and the negative going change in voltage in the collector circuit thereof is cross-coupled to the base of the transistor Q87 driving the transistor Q87 to conduction. Coupling through the networks, including the networks N12 and N13, of the positive and negative going voltages, respectively, in the collector circuits of the transistors Q87 and Q88 to the bases of transistors Q89 and Q90, respectively, switches the transistor Q90 to conduct and the transistor Q89 so that it does not conduct. When transistor Q87 conducts its collector circuit is coupled substantially to ground potential and the terminal CO–1 switches from some negative potential to approximately ground potential. At the same time, the terminal $\overline{CO}$–1 goes negative.

As will be seen by reference to FIG. 14, the terminals J and K of flip flop FCO1 are commonly connected to a source of input voltage. This input voltage source is derived from the collector circuit of transistor Q73 of gate circuit G and the input to the 10° decade is identified at that point. The J1 and K1 input terminals are also commonly connected to a terminal bearing the legend "add 1 count." This circuit is identified in FIG. 11 and is coupled to terminal TE11. Whenever a positive going voltage is applied simultaneously to the J and K input terminals, this signal, coupled to the base of the proper transistor Q87 or Q88 through the steering voltage circuits described, triggers the flip flop from the electrical state it is then in to its opposite electrical state. Similar considerations apply to the simultaneous application of positive going voltages to the terminals J1 and K1.

The flip flop FCO2 illustrated in FIG. 17, and which is typical, as noted, of the three remaining flip-flops in each counter decade, again comprises four transistors, a first transistor pair including the p-n-p transistors Q91 and Q92 having grounded emitter circuits and having collector circuits resistor coupled to the collector circuits of the second transistor pair Q93 and Q94 which, as in the prior flip-flop, are n-p-n transistors having their emitters commonly coupled by a resistor R166 to −15 v. The base circuits of transistors Q91 and Q92 are coupled to +15 v. by resistors R167 and R168, respectively, and the base circuits of transistors Q93 and Q94 are coupled to −15 v. by resistors R169 ano R170, respectively. The terminal CO–2 is connected to the collector of transistor Q93 and the terminal $\overline{CO}$–2 is connected to the collector of transistor Q94. Cross-coupling networks N14 and N15 cross-couple the collectors and bases of the first transistor pair and cross-coupling networks N16 and N17 cross-coupled the collectors and bases of the second transistor pair. Cross-coupling networks N18 and N19 cross-coupled the collectors and bases of transistors Q91, Q94 and Q92, Q93, respectively. The J and K input terminals of this flip-flop are coupled through coupling capacitors C43 and C44 respectively, to the anodes of diodes D39 and D40, respectively, the cathodes of which are coupled to the respective bases of the first transistor pair. Control voltage terminals *Jc* and *Kc* are coupled to the anodes of the diodes D39 and D40. Setting and resetting voltages are applied to the terminals $R_j$ and $R_k$, respectively, which in turn are coupled by coupling capacitors C46 and C47 to the anodes of diodes D41 and D42, the cathodes of which are coupled to the respective bases of transistors Q91 and Q92. As described in connection with FIG. 16, positive going voltage on terminal $R_j$ sets the flip-flop to its "1" representing electrical state in which collector circuit CO–2 is in the higher of its two voltage states and the application of a positive going voltage to the terminal $R_k$ switches the flip-flop to its "0" representing electrical state with the terminal $\overline{CO}$–2 in the higher of its two voltage states. The flip-flop is triggered by input voltages to terminal $T_r$ which is coupled by a coupling capacitor C45 to the anodes of diodes D37 and D38, the cathodes of which are coupled to the collector circuits. A positive going voltage on terminal $T_r$ is coupled through that cross-coupling circuit N14 or N15 from the collector circuit which is at the lower potential. Thus, if the collector circuit CO–2 is at the lower of its two potentials and the circuit $\overline{CO}$–2 at the higher, that is, ground potential, a positive going voltage on terminal $T_r$ rising slightly above ground potential results in coupling of a positive going pulse to the base of transistor Q92 cutting off this transistor and causing the flip-flop to switch to its opposite voltage state in which the collector circuit CO–2 is in the higher of its two voltage states.

In FIG. 14 the least significant flip-flop of each decade is on the left and the flip-flops are weighted from left to right, 1, 2, 4 and 8, in keeping with conventional practice. The reset input circuit, so designated in the drawing, is the output of the emitter circuit of transistor Q79 of the reset circuit RS. This circuit is coupled to a reset terminal of each flip-flop of each decade of the counter, only two decades being shown, and in each decade it is coupled to the $R_j$ input terminal of the least significant and next most significant flip-flop and to the $R_k$ terminal of the two remaining flip-flops. This, upon the application of an input voltage to the reset terminal, each decade of the counter is set to represent binary 3, that is, 0011. The output terminal CO–1 of flip-flop FCO1 is connected directly to the J input terminal of flip-flop FCO2 and the output terminal $\overline{CO}$–1 is connected directly to the trigger terminal *Tr* of flip-flop FCO2. The output terminal CO–2 of flip-flop FCO2 is connected directly to the K input terminal of flop-flop FCO3 and again the $\overline{CO}$–2 output terminal of flip-flop FCO2 is connected directly to the trigger terminal *Tr* of flip-flop FCO3. The output terminal $\overline{CO}$–3 of flip-flop FCO3 is connected directly to the trigger terminal *Tr* of flip-flop FCO4.

Each decade of the counter is additionally controlled in its counting cycle to enable switching from 1100 configuration (least significant on the right) representing the highest count in the decade (9) to its 0011 configuration (least significant on the right), representing herein the decimal number "0," by means of a transistor switching circuit comprising an n-p- transistor Q85. Since these transistor switching circuits are the same for the several decades, they are similarly identified throughout as indicated in the $10^1$ decade in FIG. 14. Transistor Q85 has a collector circuit connected directly to +15 v. and an emitter circuit connected to −15 v. through a resistor R149. The collector and base of the transistor are connected by means of a resistor R146. Diodes D47 and D48 have their anodes coupled to the base of transistor Q85 and their respective cathodes coupled to the terminals CO–3 and CO–4 of flip-flops FCO3 and FCO4. When either one or both of the terminals CO–3 and CO–4 are in the lower of their two voltage states the transistor Q85 is cut off but when both terminals are in their upper voltage states the transistor conducts and in conducting couples the emitter circuit approximately to +15 v. applying a positive bias to the resistors R147 and R148, respectively. Resistor R147 is connected to terminal *Jc* of the flip-flop FCO2 and resistor R148 is connected to the terminal *Kc* of the flip-flop FCO3. By reference to FIG. 17 it will be seen that a high voltage coupled to either of terminals *Kc* or *Jc* acts as enabling voltage and that a negative potential acts as a disabling voltage on that particular terminal. Thus, when a terminal is enabled the application of a positive going potential on the associated J or K terminals indicated results in switching of the flip-flop. When the flip-flop is in the configuration 1100 (least significant on the right) the counting decade is to be switched to the configuration 0011 (least significant on the right) with the next incoming pulse to be counted. When in the configuration 1100 (least significant on the right) the diodes D47 and D48 are back-biased, the terminals CO–3 and CO–4 being in the higher of their two voltage states. Transistor Q85 is conducting and the emitter circuit is at the higher of its two potentials coupling positive bias to both resistors R147 and R148.

The timing diagram illustrated in FIG. 15 depicts the operation which takes place at this time. Time is counted from the left and the decimal numbers for each binary configuration are depicted adjacent the positive going edges of the shaped signal VCO$s$ depicted at the top of the sheet. The counter counts in straight binary through the configuration 0100 (least significant on the right) representing decimal number "1" through 1100 (least significant on the right) for decimal number "9," by reason of interconnection of the counter stages as illustrated in FIG. 14. In the configuration 1100 the terminals CO–3 and CO–4, being in their higher voltage states, apply enabling biases through the resistors R147 and R148 to the J$c$ and K$c$ terminals, respectively, of flip-flops FCO2 and FC3. Under these conditons the next input pulse simultaneously appearing in the J and K terminals of flip-flop FCO1 triggers this flip-flop from its "0" representing electrical state to its "1" representing electrical state and terminal CO–1 switches in a positive direction. This positive going signal is coupled to the J terminal of flip-flop FCO2 which is now enabled and switches this flip-flop from its present "0" representing electrical state (see the timing diagram) to its "1" representing electrical state. Output terminal CO–2 of flip-flop FCO2 is coupled to the K input terminal of flip-flop FCO3 which is now enabled by the bias coupled to the resistor R148. This switches this flip-flop to its "0" representing electrical state and the positive going voltage excursion on terminal $\overline{C}$O–3 coupled to the trigger terminal T$r$ of the flip-flop FCO4 causes this flip-flop to change from its present "1" representing electrical state to its "0" representing electrical state so that the decade is now in the configuration 0011 representing the decimal number "0" and at the beginning of the new count in the excess 3 code.

At the time the most significant flip-flop FCO4 switches to its "0" representing electrical state from its "1" representing electrical state, and output pulse is coupled to the J–K input terminals of the flip-flop FC11 which is the least significant flip-flop of the 10$^1$ decade of the counter. This flip-flop, by reason of the resetting function of the reset signal, is now in its "1" representing electrical state and consequently switches to its "0" representing electrical state with the application of this positive going signal. The connection from terminal $\overline{C}$O–1 to the terminal T$r$ of flip-flop FC12 causes this flip-flop to switch from its "0" representing electrical state which in turn switches the flip-flop FC13 from its "0" representing electrical state to its "1" representing electrical state. The next full cycle of the decade advances the count operation 1 bit more in the 10$^1$ decade, etc. The other decades are similarly interconnected and will be understood from this representation of the 10$^0$ and the 10$^1$ decades.

RANGE AND POLARITY CIRCUITS

The 10$^5$ decade of the counter includes only two flip-flops FC51 and FC52, as noted in FIG. 11. These operate at relatively low frequency and will be of a simpler type, as earlier noted herein. Flip-flop FC51 comprises transistors Q99 and Q100 connected in grounded emitter configuration and having respective collector circuits which are resistor connected to —15 v., as indicated. Cross-coupling networks N22 and N23 cross-couple the collectors and emitters to provide switching action. Steering voltages are coupled through diodes D36 and D37 from the collector circuits $\overline{C}$5–2 and C5–2, respectively, of the flip-flop FC52 while coupling capacitors C38 and C39 commonly coupled to output terminal $\overline{C}$4–4 of the highest order flip-flop of the 10$^4$ decade of the counter are respectively coupled to the anodes of diodes D36 and D37 to effect controlled switching of this flip-flop in the presence of pulses from the terminal C4–4. Reset voltage is coupled from the reset terminal indicated by respective capacitors C50 and C51 through respective diodes D39 and D40 to the bases of transistors Q100 and Q102 of the respective flip-flops. Positive going switching voltages insure that transistors Q100 and Q102 are cut off so that both flip-flops are in their "0" representing electrical states with terminals C5–1 and C5–2 in the higher of their two voltage states. Input voltages from the terminal $\overline{C}$4–4 are coupled by capacitor C40 through a diode D38 to the base of transistor Q101. Resistor R200, coupled from the collector circuit of transistor Q100 provides a control bias in the base circuit of the transistor Q101. When the collector circuit of transistor Q100 is low the base circuit of transistor Q101 is inhibited and when the collector circuit transistor Q100 is high the base circuit is enabled.

When the flip-flops are reset the output terminals C5–1 and C5–2 are in the lower of their two voltage states. An input signal from terminal $\overline{C}$4–4 is now coupled to the base of transistor Q99 triggering this flip-flop from its reset "0" representing electrical state to its "1" representing electrical state. This signal is inhibited in the base circuit of transistor Q101 at the time the signal at terminal $\overline{C}$4–4 exists because the collector circuit C5–1 of transistor Q100 is in the lower of its two voltage states. The next signal from terimnal $\overline{C}$4–4 is now coupled to the base of transistor Q101 and triggers the flip-flop FC–52 to its "1" representing electrical state in which the terminal C5–2 is high. However, at the time of existence of signal $\overline{C}$4–4 the base circuit of the transistor Q100 is disabled by the low potential coupled thereto before the circuit C5–2 is switched. Thus, the flip-flop FC51 does not change electrical state. A third input signal from the terminal $\overline{C}$4–4 may now be coupled to the base of transistor Q100 and to the base of the transistor Q102 since both the circuits C5–1 and C5–2 are in the higher of their two voltage states which resets the flip-flops.

| | FC51 | FC52 |
|---|---|---|
| 0 | 0 | 0 |
| 1 | 1 | 0 |
| 2 | 1 | 1 |
| 3 | 0 | 0 |

The flip-flops FC51 and FC52 are employed to indicate range and the polarity of the input voltage and for this purpose the outputs of the flip-flops FC51 and FC52 are utilized to control a range flip-flop FR$a$1 and a sign flip-flop FS1. The range flip-flop comprises respective p-n-p transistors Q103 and Q104 with cross-coupling networks N26 and N27 between the respective collectors and bases. The emitter circuits are commonly coupled through a resistor R210 to +15 v. and the respective collectors are coupled by resistors R211 and R212 to —15 v. The terminals C5–1 and C5–1 of flip-flop FC51 are coupled by respective diodes D41 and D42 and respective resistors R213 and R214 to the bases of the transistors Q103 and Q104. An input triggering signal SN$s$ or SD$s$ is coupled by respective diodes D45 and D46 to capacitors C41 and C42 which latter respectively couple the input signals to the anodes of diodes D41 and D42 in the base circuits of transistors Q103 and Q104. The output signals of terminals $\overline{C}$5–1 and C5–1 act as enabling voltages when in the higher of their two voltage states to control triggering of the range flip-flop FR$a$1 in the presence of the signals SN$s$ or SD$s$, as indicated.

The sign flip-flop FS1 comprises a pair of p-n-p transistors Q105 and Q106 having a common emitter circuit connected to +15 v. through a resistor R220 and having respective collector circuits connected by respective resistors R221 and R222 to —15 v. as indicated. Cross-coupling networks N28 and N29 cross-couple the collectors and bases of the transistors. Resistors R223 and R224 are connected in series with respective diodes D43 and D44 and connect the terminals $\overline{C}$5–2 and C5–2 of flip-flop FC52 to the bases of respective transistors Q105 and Q106. Signals SN$s$ and SD$s$ are coupled to capacitors C43 and C44 which are respectively coupled to the anodes of diodes D43 and D44 in the base circuits of transistors Q105 and Q106. The voltages $\overline{C}$5–2$s$ and C5–2$s$ in the higher of their two voltage states enable the respective base circuits of the transistors.

Over range and sign of the input number to the system are detected by respective gas discharge tubes indicated. The over range tube is designated OR. When the polarity of the input voltage is negative the tube P− will be illuminated and when the polarity of the input number is positive the tube P+ will be illuminated. These may be any suitable voltage sensitive gas discharge tubes. The tube OR is controlled by a transistor switching circuit comprising a pair of n-p-n transistors Q107 and Q108 connected in series as shown. The base of transistor Q107 is connected in a voltage divider between the collector circuit of transistor Q104 of the range flip-flop and −15 v. as indicated. The base of transistor Q108 is connected to a voltage divider which is connected between +180 v. as shown, and ground. The bias on this latter transistor tends to cause conduction thereof when the emitter is at approximately ground potential. When the collector circuit of the transistor Q104 of the range flip-flop is at the lower of its two potentials transistor Q107 is cut off and the range light OR is not illuminated. Whenever the collector circuit switches to the higher of its two voltage states transistor Q107 is driven to conduction and an illuminating potential is connected to the range tube OR which now lights. The function of the transistor circuits for the polarity indicating lights is similar to that for the range indicating light, transistors Q109 and Q110 conducting when the collector circuit of transistor Q105 is at the higher of its two voltage states, and transistors Q111 and Q112 conducting when the collector circuit of transistor Q106 is at the higher of its two voltage states.

The input signals described in connection with FIG. 18 and the function of the flip-flops FC51, FC52, **FR*a*1 and FS1 in response to these signals will be better understood from a consideration of the logical organization of the system for exhibiting decimal numbers indicative of the sign and magnitude of an input voltage. As noted in connection with FIG. 1, when the input voltage is zero the voltage controlled oscillator VCO produces a predetermined output frequency. For one practical embodiment of this invention this output frequency is 200 kilocycles. This 200 kilocycle signal periodically coupled into the counter under the control of the timing counter TC produces a zero representing count in the counter expressed in decimal numbers as 1.99999. Thus, each decade of the counter CO is set to its greatest binary configuration, 1100 (least significant on the right), and the flip-flops FC51 and FC52 of the $10^5$ decade are set to the configuration, 01 (least significant on the right), that is, the flip-flop FC52 is in its "0" representing electrical state and the flip-flop FC51 is in its "1" representing electrical state. Thus, the terminal C5–1 is in the higher of its two voltage states and the base of the transistor Q104** is enabled. Thus, with the occurrence of a signal SN*s* or SD*s* a switching voltage is coupled to the base of transistor Q104 switching this transistor off if it had been conducting, whereupon its collector voltage drops to the lower of its two voltage states which disables the over range indicator OR and indicates that the count which is in the counter is within range. If a positive voltage is applied to the input voltage circuit I (see FIG. 1) the frequency of the voltage controlled oscillator VCO decreases. If this voltage is within range the count in the counter will be less than 1.99999 but will not be less than 1.00000. If the positive input voltage is too large the frequency of the voltage controlled oscillator will be insufficient during a count interval to drive the counter to the minimum count 1.00000, in which case the flip-flop will remain in its "0" representing electrical state with the terminal $\overline{\mathbf{C5}}$–1 in the higher of its two voltage states. The terminal $\overline{\mathbf{C5}}$–2 is in the higher of its two voltage states as preset by the reset voltage and the terminal C5–2 is in the lower of its two voltage states. The signal SN*s* may now be coupled into the base of transistor Q103 cutting it off and driving transistor Q104 to conduction. The rising collector voltage coupled to the base of transistor Q107 causes conduction illuminating the range light OR indicating that the counter is out of range. When the terminal $\overline{\mathbf{C5}}$–2 is in the higher of its two voltage states the signal SD*s* is coupled to the base of transistor Q105 switching it off. Transistor Q106 conducts, its rising collector voltage coupled to the base of transistor Q111 completes the operating circuit for the tube P+ indicating that a positive voltage had been applied to the input to the counter. A negative voltage increases the frequency.

With the explanations hereinabove, the specific way in which information is transferred from the counter CO to the memory and read out circuits in FIG. 19 may be explained. Assuming that the input voltage to the system was a negative voltage, it will be understood that the counter will indicate some number above 1.99999. Consequently, the $\mathbf{10^5}$ counter stage will be set to its 11 configuration (least significant bit on the right) indicating that the first decimal digit is two. Thus, the terminal C5–2 is in the higher of its two voltage states. Switching of the flip-flop FC52 to its one representing electrical state occurs sometime during the count interval. As will be seen by reference to FIG. 11 the flip-flop FP2 has its J input terminal coupled by a capacitor C34 to the terminal C5–2 of the flip-flop FC52. Thus, the flip-flop FP2 in the programmer is switched to its "1" representing electrical state during the count interval with the output terminal P2 in the higher of its two voltage states. When this happens the diode D19 back biases the input diode D18 to the input circuit of the flip-flop FP3.

FIG. 12 shows the state of the flip-flop FP2 when a negative input voltage is applied to the system. As shown there the flip-flop is switched to its "1" representing electrical state in which the signal **P2*s* at terminal P2 is in the higher of its two voltage states. At this time the flip-flop FP3 is in its "0" representing electrical state with the signal $\overline{\mathbf{P}}$3*s* at terminal $\overline{\mathbf{P}}$3 in the higher of its two voltage states. Since the flip-flop $\overline{\mathbf{P}}$3 controls shifting of information between the counter and the storage circuits in the memory and read out circuits of the system, when it is in this electrical state, such information transfer cannot take place until the flip-flop FP2 is switched back to its "0" representing electrical state. As earlier described, the K side of the flip-flop FP2 is controlled by the signal $\overline{\mathbf{T}}$8*s* from the timing counter TC, which controls transistor Q74, the collector circuit of which is coupled by means of diode D17 and capacitor C35 to the input circuits J and K of the flip-flop FP3. At the end of the count interval the flip-flop FP1 is switched to its one representing electrical state. Thus, the terminal $\overline{\mathbf{P}}$1 is in the lower of its two voltage states and the inhibiting voltage is decoupled from the K input side of the flip-flop FP2 and is also decoupled from the input circuits flip-flop FP3 which is now inhibited solely by the voltage coupled from the terminal P2 of the flip-flop FP2. With reference to FIG. 12, subsequent to switching of the flip-flop FP1 the next negative going excursion of signal $\overline{\mathbf{T}}$8*s* switches the flip-flop FP2 from its "1" representing electrical state to its "0" representing electrical state resulting in a positive going excursion as shown at the terminal $\overline{\mathbf{P}}$2. Terminal $\overline{\mathbf{P}}$2 is coupled by diode D16 to a terminal TE11 which is also coupled to the output terminal PO of programmer flip-flop FP "0" by means of the resistor R130**. During the count interval the flip-flop FPO is in its "1" representing electrical state and the signal PO*s* is in the higher of its two voltage states, as will be seen in FIG. 12. Consequently, during this period of time the terminal TE11, as seen in FIG. 12, is in the higher of its two voltage states switching to the lower of its two voltage states at the time the terminal PO switches to the lower of its two voltage states. Terminal TE11 remains in this voltage state until the terminal $\overline{\mathbf{P}}$2 switches in a positive direction, as indicated by the signal $\overline{\mathbf{P}}$**2*s*, at which time the voltage at terminal TE11 switches positive. As will be seen by reference to FIG. 14 terminal TE11** is the add 1 count terminal. This positive going excursion on the flip-flop input terminals causes the least significant flip-flop FCO1 of the $10^0$ stage of the counter to change its electrical state which adds one count to the counter.

When the flip-flop FP2 switches to its "0" representing electrical state the terminal P2 swings to the lower of its two voltage states. The signal $\overline{T8}$ on its next negative going voltage excursion is now affective to switch the flip-flop FP3 from its "0" representing electrical state to its "1" representing electrical state as seen in FIG. 12. The signal $\overline{P3}s$ is now in its lower voltage state which unclamps gate diodes D26 and D28 in the respective gating circuits for the shift direct and shift nines complement circuits SD and SN respectively. Since a negative input voltage has been applied to the system the terminal C52 of the flip-flop FC52 is in the higher of its two voltage states which couples a gate disabling voltage via diode D27 to the gate in the input circuit of the shift nines complement circuit SN. Terminal $\overline{C52}$ being low couples a low voltage via diode D25 to the input terminal of the gate for the shift direct circuit SD. The next positive going excursion of the signal T5*s*, signals $\overline{T8}$ and T14 both being low, results in a negative going excursion at terminal TE10 in the collector circut of input transistor Q80. A low voltage is now coupled to the gating circuit by diode D24 which enables the gate. This low voltage, as described at an earlier point herein, causes the transistor Q77, which is the output transistor of the shift direct circuit SD, to be cut off so that its emitter circuit voltage drops. During the interval when the terminal $\overline{T8}$ is low the emitter circuit voltage of transistor Q77 represented in signal SD*s* in FIG. 12, follows the voltage excursion of the collector circuit of the input transistor Q80 and with the next positive going excursion of signal $\overline{T8}s$ the signal SD*s* is held low, switching positive and remaining in the higher of its two voltage states with the next positive going excursion signal of $\overline{P3}$.

The first positive going excursion of the signal SD*s* is coupled to the shift direct input terminal of each of the transfer circuits illustrated in FIG. 19 yet to be described, and is effective at this point to cause shifting directly of the information stored in the counter to the memory storage flip-flops FMO1 through FMO4 of the $10^0$ storage circuit of the memory and read out section of the system. This same sort of transfer takes place for each of the other memory and storage decades through flip-flop FM44 of the $10^4$ decade of the memory and read out circuit. These other circuits are not detailed, being duplicates of the circuits of the $10^0$ decade.

The reset signal RS*s* in FIG. 12 is produced by the reset circuit RS. During normal counting the flip-flop FP3 is in its "0" representing electrical state and its output terminal P3 is in the higher of its two voltage states. Terminal P1 of the flip-flop FP1 is also coupled with the signal P3 to control the gate at the input circuit of the reset circuit RS. As earlier described diodes D20 and D21 couple terminals P1 and P3 to the gate. The collector of the input transistor Q80 being coupled by diode D22 to the gate circuit. During the counting interval terminal P1 is in the lower of its two voltage states as is terminal P3. As long as the signal T14 is high, transistor Q80 is cut off and the terminal TE10 is in the lower of its two voltage states. This enables the gate causing transistors Q78 and Q79 to conduct and the reset signal RS*s* is in the higher of its two voltage states. At the end of the count interval flip-flop FPO is switched to its "1" representing electrical state, switching flip-flop FP1 to its "1" representing electrical state. Signal P1*s* goes to the higher of its two voltage states disabling the gate for the reset circuit RS and the output signal RS*s* drops to the lower of its two voltage states. During the operate interval following the count interval the flip-flops FP1 and FP3 are again switched to their "0" representing electrical state as seen in FIG. 12 and as earlier described. With the next negative going excursion of terminal TE10, the signal T14*s* being low and the signal $\overline{T8}s$ going low, the signal RS*s* swings positive and follows the excursion of the signal T5*s*. This positive going excursion of signal RS*s* is coupled to the reset terminal of the counter as seen in FIG. 14 and the other reset circuit yet to be described herein, setting the counter circuit decades to their "0" representing electrical state.

If the input voltage had been positive, the timing diagram of FIG. 13 applies. As earlier mentioned, a positive input voltage reduces the counter output frequency. Consequently, the count at the counter will be less than 1.99999 but must be more than 1.00000 to be within range. In this set, the flip-flop FC51 is switched to its "1" representing electrical state and the flip-flop FC52 is switched to its "0" representing electrical state. Thus, the signal C52*s* is low throughout the count interval and being low does not switch the flip-flop FP2 from the "0" representing electrical state in which it is switched by the signal $\overline{T8}$ as described. Thus, there are no inhibiting voltages on the input circuit to the flip-flop FP3 and the next going excursion of the signal $\overline{T8}s$, subsequent to the switching of the flip-flop FP1 to its "1" representing electrical state, switches the flip-flop FP3 to its "1" representing electrical state, establishing the beginning of the shift interval and inhibiting the reset circuit RS. Signal $\overline{P3}s$ is low and signal C5–2*s* is low. Hence, the next negative excursion of terminal TE10 enables the shift nines complement circuit SN, and the signal SN*s* appears as indicated in FIG. 13 within the interval of time that the flip-flop FP3 is in its "1" representing electrical state. This operation is exactly the same as that described for the negative input voltage but it occurs at an earlier point in time in the operating interval of the system. Thus, the contents of the counter are shifted to the storage flip-flops of the memory and read out circuits MR. With reference to FIG. 19, the signal SN*s* is coupled to the cross-coupling circuits of the transfer section of the memory and read out circuits and in this situation, for example, set the memory flip-flops exactly opposite to the settings of the counter flip-flops to affect transfer of the nines complement. In this operation the signal TE11*s* remains constantly in its "0" voltage state as indicated since the flip-flop FP2 is never switched from its "0" representing electrical state.

MEMORY AND READ OUT

The memory circuits are comprised of a plurality of flip-flops, one flip-flop for each counter flip-flop, to which either the count stored in the counter is transferred directly or the nines complement is transferred. These flip-flops are very similar to flip-flops which have been described hereinabove in the polarity and range circuits. Since the flip-flops illustrated in FIG. 19 are all the same, they all bear the same reference characteristics and the description of one applies to all. FIG. 19 indicates only the $10^0$ memory and read out stage of the memory and read out circuit, there being one such stage for each decade, $10^0$ through $10^4$, in the counter.

The flip-flops comprise p-n-p transistors Q95 and Q96 including cross coupling circuits N20 and N21 to speed up switching. The common emitters are connected to +15 v. by a resistor R174 and the collector circuits are connected by resistors R175 and R176, respectively, to −15 v. Resistors R177 and R178 additionally respectively connect the bases of the transistors to +15 v.

Each flip-flop is controlled by its own transfer circuit. Each transfer circuit is provided with two input terminals. The uppermost transfer circuit indicated has its input terminals connected to the collector circuits CO–1 and $\overline{CO}$–1 which are the output circuits of the least significant flip-flop of the least significant decade of the counter. Similarly the remaining transfer circuits are connected to the output terminals indicated on the respective higher order flip-flops of the $10^0$ decade of the counter. The terminal CO–1 is coupled by resistor R179 and diode D32 in series therewith to the base of transistor Q95 and terminal $\overline{\text{CO}}$–1 is coupled by resistor R182 and series connected diode D35 to the base of transistor Q96. Each terminal is additionally cross-coupled to the base of the opposite transistor, thus terminal CO–1 is coupled by resistor R180 and series connected diode D34 to the base of transistor Q96 and terminal $\overline{\text{CO}}$–1 is coupled by resistor R181 and series connected diode D33 to the base of transistor Q95. The counter input voltages act as enabling voltages on the transfer circuit. There are additionally two switching voltages coupled to each transfer circuit. One switching circuit receives the shift direct signal SD*s* and the other switching circuit receives the shift nines complement signal SN*s*. As will be seen the shift direct signal is coupled by capacitors C42 and C43 respectively to each of the direct coupled circuits of the transfer circuit and the shift nines complement signal SN*s* is coupled by capacitors C40 and C41 respectively to the cross coupling circuits of the transfer circuit to set the flip-flop to an electrical state which is the complement of the enabling voltage on one of its two input circuits.

The outputs of the memory flip-flops are selectively coupled to transistor gate circuits so that selective gate circuits will be enabled and operated upon the occurrence of a predetermined combination of flip-flop output signals. The memory flip-flops are designated FMO1 through FMO4. The output terminals of the flip-flop FMO1 are designated MO1 and $\overline{\text{MO1}}$. The output terminals of flip-flop FMO2 are MO2 and $\overline{\text{MO2}}$. The output terminals of flip-flop FMO3 are designated MO3 and $\overline{\text{MO3}}$ and the output terminals of flip-flop FMO4 are designated MO4 and $\overline{\text{MO4}}$.

The counter configuration signal combinations which are to be utilized to illuminate respective ones of the read out tubes of the read out device RD, are indicated adjacent the respective transistor gates TG0 through TG9. The combination adjacent the transistor gate TGO is denoted 0011 in conventional binary notation in the excess three code as noted above, in keeping with the coding of the counter. In these binary notations the least significant bit is on the right. Thus, with reference to the notation 0011 this may be written $\overline{\text{MO4}}$.$\overline{\text{MO3}}$.MO2.MO1. Although four binary bits are involved in each specific binary notation, there are unique logical combinations of the outputs of the flip-flops using less than four binary bits. It has been found that in each case no more than three binary bits designate a unique combination for enabling a digit indicating circuit. These are specifically identified at the inputs of all the transistor gates.

The transistor gates are identical so only the gate TGO is illustrated in detail. It is assumed in this discussion that the read out device is a gas tube type of indicator including the decimal numbers 0 through 9 which are selectively energized, as indicated, by the outputs of the individual gate circuits connected thereto. The read out device is only illustrated in schematic form. The output of each gate circuit being represented as an electrode circuit for the particular number, indicating a means for applying a break down potential to that particular gas tube section of the read out device RD to cause that number to light by gas discharge. Of course other suitable devices may be employed.

Each transistor gate comprises a pair of series connected transistors Q97 and Q98. The base of transistor Q98 is connected between a pair of series connected resistors R186 and R187 connected in series with a resistor R188 between +180 v. and ground, and forming a voltage divider circuit, applying a conducting bias to the base of transistor Q98 at such time as the emitter circuit is coupled approximately to ground potential as a consequence of conduction of the series connected transistor Q97. The input to the base of transistor Q97 comprises three parallel connected resistors numbered R183, R184 and R185 respectively. As illustrated resistor R183 is coupled to terminal $\overline{\text{MO3}}$ and resistors R184 and R185 are commonly coupled to the flip-flop output terminal $\overline{\text{MO4}}$. In this particular case the signal pair $\overline{\text{MO3}}$ and $\overline{\text{MO4}}$ uniquely indicate the decimal number "0" and additional connection with other flip-flops is unnecessary. At such time as the signals $\overline{\text{MO3}}$ and $\overline{\text{MO4}}$ are in the higher of their two voltage states, transistor Q97 conducts and the "0" digit energizing electrode is coupled substantially to ground potential through the two transistors indicated. This enables the "0" digit which now lights up. Similar explanations apply to the other circuits herein indicated.

RANGE COUNTER

As will be recalled from the description of FIG. 1, provision is made for range changing at the input voltage circuit I. The purpose of this circuit under the control of the counter CO and the memory and readout circuit MR, is to reset the attenuator to provide down-ranging, that is, reduction of the attenuator impedance if the capacity of the counter and read-out circuits is not being completely used, and to provide an up range adjustment of the attenuator, that is, in respect to impedance, in the event the counter and read-out circuits are being driven past their capacities.

A circuit for accomplishing this operation is illustrated in FIG. 20 which provides for three range settings on the attenuator. These range settings are generally referred to as A, B and C hereinafter and provide scales of 0 to 10 for A, 10 to 100 for B, and 100 to 1000 for C. The circuit includes an up-down counter comprising a pair of flip-flops FR*a*2 and FR*a*3 and is referred to as the range counter. Flip-flop FR*a*2 comprises a pair of p-n-p transistors Q118, Q119 having grounded emitter circuits and having collector circuits coupled by respective series resistors to −15 v. Cross-coupling resistor capacitor networks connect the respective collectors to the bases of the opposite transistors. Flip-flop FR*a*3 comprises transistors Q120 and Q121 of the p-n-p type having grounded emitters and having collector circuits coupled through respective series resistors to −15 v. Cross-coupling networks are again employed between the collectors and bases. All of the base circuits of these transistors are coupled through suitable resistors to +15 v. as shown. Output terminal $\overline{\text{R}a}$2 of flip-flop FR*a*2 is coupled by means of a diode D50 to a capacitor C55 which in turn is coupled by a diode D51 to the base of transistor Q120. Output terminal R*a*2 is coupled by a diode D52, a capacitor C56 and a diode D53 to the base of transistor Q121. Input terminal TE18 is coupled by a diode D54, a capacitor C57 and a diode D55 to the base of transistor Q118. A parallel branch including a capacitor C58 and diode D56 couples terminal TE18 to the base of the other transistor Q119 of flip-flop FR*a*2. A second input terminal TE20 is coupled by diode D57, a capacitor C59 and a diode 58 to the base of transistor Q19 and a parallel branch including capacitor C60 and diode D59 couples terminal TE20 to the base of transistor Q118. Thus, input signals applied to terminals TE18 and TE20, respectively, are coupled to the bases of both of the transistors Q118 and Q119 to effect switching thereof. Switching of these transistors is controlled by suitable biasing circuits. One biasing circuit including a resistor R240 couples the terminal $\overline{\text{R}a}$3 to the anode of diode D59. A second biasing circuit including resistor R241 couples the terminal R*a*3 to the anode of diode D55. Both of these biasing circuits are the base circuit of the transistor Q118. Whenever the voltages at terminals $\overline{\text{R}a}$3 and R*a*3 are high these voltages (which do not exist simultaneously) enable the respective input circuits. Resistors R242 and R243 couple the anodes of diodes D56 and D58, respectively, to the terminal R*a*2 which enables the circuit to the base of transistor Q119 whenever the terminal R*a*2 is in the higher of its two voltage states. This is the condition in which transistor Q119 is conducting. Similarly, resistors R244 and R245 couple the terminals $\overline{\text{R}}a3$ and R*a*3 to the anodes of diodes D51 and D53 to respectively enable the base circuits of transistors Q120 and Q121 of the flip-flop FR*a*3.

The range counter flip-flops are controlled by a down-gate comprising a transistor Q115 and an up-gate comprising a transistor Q116. The emitter circuits of both of these transistors are grounded. The collector circuits are each resistor coupled to −15 v. and are each further resistor coupled to the base of a third grounded emitter transistor Q117 the base circuit of which is resistor coupled to +15 v. and the collector cicuit of which is resistor coupled to −15 v. The base circuit of transistor Q117 is thus resistor coupled in a voltage divider between +15 v. and −15 v. and the voltage division is such that the transistor Q117 normally conducts. The base of the down gate transistor Q115 is coupled to a terminal TE15. By reference to FIG. 19 it will be seen that terminal TE15 is coupled to ground and which is connected in series in a voltage divider between +180 v. and ground including resistors R186, R187 and R188. Whenever the transistors Q97 and Q98 are not conducting the terminal TE15 is at a potential approximately 0.7 v. above ground as a result of the forward voltage drop across the diode. However, when the transistors Q97 and Q98 are conducting the collector circuit of transistor Q98 is coupled substantially to ground potential. Thus, the termminal TE15 is effectively decoupled from ground by the diode D65 and is coupled in a voltage divider network approximately between ground potential at the collector of transistor Q98 and −15 v. via the resistor in the base circuit of transistor Q115. Terminal TE15 is therefore biased to some negative potential.

When transistors Q97 and Q98 are conducting the zero digit of the read-out device RD is illuminated indicating that this decade is unused. Although FIG. 19 illustrates the $10^0$ decade the connection of diode D65 and terminal TE 15 is contemplated only in the $10^4$ decade which is the most significant decade of the counter and memory circuits. For the assumed condition, this decade is unused and should be used if the full range of the counter is to be utilized. To utilize this stage or decade of the counter, provision must now be made to down-range the attenuator circuit of the input voltage circuit I so that a larger voltage is coupled to the input circuit of the converter system.

Whenever the transistor Q115 conducts the rising collector potential coupled to the base circuit of transistor Q117 cuts off this transistor. The collector circuit of transistor Q117 is coupled by resistor R250 and R251 to the cathodes of diodes D52 and D54, respectively. In the higher of the two voltage states of the collector of transistor Q117 the diodes D52 and D54 are backbiased, effectively decoupling the terminals R*a*2 and TE18 from the input circuits of the respective flip-flops. In the presently existing lower voltage state coupling is provided.

The base of transistor Q116 is coupled to the terminal $\overline{\text{C}}5–1$ of the flip-flop FC51 (see FIG. 18). As will be recalled from the description of these polarity indicating flip-flops FC51 and FC52 a first pulse switches the flip-flop FC51 to its "1" representing electrical state from its "0" representing electrical state in which it was preset. Thus, the terminal $\overline{\text{C}}5–1$ is switched to the lower of its two voltage states. When in the "1" representing electrical state the output of the $\overline{\text{C}}5–2$ circuit of the flip-flop FC52 coupled to the base of transistor Q99 of flip-flop FC51 inhibits further switching of this flip-flop. The second input pulse does not affect the flip-flop FC51 but because the terminal C5–1 is in the higher of its two voltage states is now effective in switching the flip-flop FC52 from its preset "0" representing electrical state to its "1" representing electrical state under which condition the terminal $\overline{\text{C}}5–2$ is in the lower of its two voltage states. A third input pulse will now switch the flip-flop FC51 to its "0" representing electrical state. Thus, the flip-flop FC51 is in its "0" representing electrical state as it is preset and is not again in its "0" representing electrical state unless reset or unless a count of 3 is reached, which is the condition of concern here.

From this it will be apparent that as long as the signal $\overline{\text{C}}5–1$ is in the lower of its two voltage states, counter operation may be assumed to be within the counter range, but the count capability will have been exceeded if the signal $\overline{\text{C}}5–1$ is switched to the higher of its two voltage states during the operating interval following each count interval. Whenever the signal $\overline{\text{C}}5–1$ is low resistors R252 and R253 are essentially coupled to ground potential. Resistor R252 is coupled to the cathode of diode D50 and resistor R253 is coupled to the cathode of diode D58 backbiasing both of these diodes and effectively decoupling the terminal $\overline{\text{R}}a2$ from the base of transistor Q120 and decoupling the terminal TE20 from the bases of both of transistors Q118 and Q119. Terminal TE18 is the down pulse input terminal of the range counter and terminal TE20 is the up pulse input terminal. The down pulse is represented in signal $\overline{\text{P}}3s$ and the up pulse is represented in signal P3*s*. As will be seen by reference to either of FIG. 12 or 13, P3 is the flip-flop determining the shift interval. Thus, the positive going excursions of the voltages P3*s* and $\overline{\text{P}}3s$ are used as the switching potentials for driving the flip-flop FR*a*2.

For the down range switching operation assume the transistor Q117 has been cut off and the backbiasing voltages have been removed from the cathodes of diodes D52 and D54. When signal $\overline{\text{P}}3s$ swings positive, switching potential is coupled through diode D54 to the capacitors C57 and C58. If the terminal $\overline{\text{R}}a3$ of the flip-flop FR*a*3 is in the higher of its two voltage states then the signal R*a*3 is low and the input signal is decoupled from the base of transistor Q118. If the terminal R*a*2 were in the lower of its two voltage states at this time the circuit to the base of transistor Q119 is inhibited at diode D56. If terminal R*a*2 is in the higher of its two voltage states this means that transistor Q118 was conducting. Thus, the switching potential applied at terminal T18 is effectively decoupled and switching cannot take place since this is the desired configuration for down ranging.

If both terminals R*a*2 and R*a*3 had been in the higher of their two voltage states then the input circuits from terminal TE18 to the bases of both transistors Q118 and Q119 would have been enabled. The switching pulse would therefore cause the flip-flop FR*a*2 to change its electrical state placing terminal $\overline{\text{R}}a2$ in the higher of its two voltage states. The rising potential on terminal $\overline{\text{R}}a2$ is coupled by the capacitor C55 into the base circuit of transistor Q120. However, coupling is inhibited because the terminal $\overline{\text{R}}a3$ is in the lower of its voltage states and this low voltage is coupled to the capacitor and the diode by the resistor R244. The flip-flop FR*a*3 therefore does not switch.

If the terminal R*a*2 were in the higher of its two voltage states and the terminal R*a*3 in the higher of its two voltage states the switching voltage would be coupled to the base of transistor Q119 causing the flip-flop FR*a*2 to change its electrical state with terminal $\overline{\text{R}}a2$ going to the higher of its two voltage states. This rising potential is not coupled to the base of transistor Q120 because of the bias of resistor R252 and the flip-flop FR*a*3 remains in its existing electrical state. Thus, the terminals $\overline{\text{R}}a2$ and $\overline{\text{R}}a3$ are in the higher of their two voltage states.

Terminal $\overline{\text{R}}a2$ is coupled to the anode of a diode D66 in the base circuit of a transistor Q122 which is one of the switching transistors of a flip-flop FMR1, the other transistor being designated Q123. This flip-flop circuit is similar to the flip-flops FR*a*2 with the exception that the emitter circuits are coupled through a common resistor R256 to +15 v. The collector circuits are respectively resistor coupled to −15 v. The output terminals are respectively designated MR1 and $\overline{MR1}$. The output terminal Ra2 of the range counter flip-flop FRa2 is coupled by a resistor R257 and diode D67 to the base of transistor Q123. The resistor coupling of the terminals $\overline{Ra2}$ and Ra2 provides steering voltages in the base circuits of the memory flip-flop FMR1.

Flip-flop FMR2 is the same as flip-flop FMR1 and comprises switching transistors Q124 and Q125 the emitter circuits of which are connected by a common resistor R258 to +15 v. and the collector circuits are coupled by respective resistors to −15 v. Output terminal $\overline{Ra3}$ is coupled by a resistor R260 to the anode of a diode D69 to the base of transistor Q124. Output terminal Ra3 is coupled by a resistor R261 to the anode of a diode D70 coupled to the base of transistor Q125. The anodes of diodes D66, D67, D69 and D70 are further coupled by respective capacitors C65, C66, C67 and C68 to the reset circuit. Thus, during the reset interval which always follows the shift interval determined by the flip flop FP3 of the programmer, the reset circuit is actuated and the memory flip-flops FMR1 and FMR2 are set into electrical states determined by the steering voltages coupled to the base circuits from the output terminals of the range counter flip-flops FRa2 and FRa3. Since terminal $\overline{Ra2}$ was high flip-flop FMR1 is switched and its terminal $\overline{MR1}$ is in the higher of its two voltage states. Terminal $\overline{Ra3}$ being in the higher of its two voltage states assures that flip-flop FMR2 will be set so that its terminal $\overline{MR2}$ is in the higher of its two voltage states. When terminals $\overline{MR1}$ and $\overline{MR2}$ are in the higher of their two voltage states transistor Q126, which has its base coupled to these terminals, becomes conducting. When the emitter of transistor Q127 approaches ground potential the transistor Q127 also conducts and its collector drops approximately to ground potential. Range light RA now lights indicating that the minimum attenuation has been selected in the full down range position.

If under these circumstances the memory and counter circuits are driven beyond their capacities the signal $\overline{C5}$-1 will switch to the higher of its two voltage states. Under these circumstances the transistor Q116 is cut off. Transistor Q115 is also cut off since the $10^4$ read-out device is now out of its "0" indicating conditon. Transistor Q117 now conducts and its collector circuit rises in potential towards ground potential. The coupling provided by resistors R250 and R251 to the bases of diodes D52 and D54, respectively, inhibit the output signal from flip-flop FRa2 and inhibit the input circuit receiving the signal $\overline{P3s}$ at terminal TE18. Since transistor Q116 is cut off the inhibiting biases are removed from the cathodes of diodes D50 and D57 at the time the signal P3s goes positive. Since the terminal $\overline{Ra3}$ is in the higher of its two voltage states the input signal at terminal TE20 is coupled to the base of transistor Q118 and flip-flop FRa2 changes electrical state with terminal Ra2 going to the higher of its two voltage states. This signal, however, is inhibited so that it is not coupled to the base of transistor Q121 since the terminal Ra3 is in the lower of its two voltage states so that flip-flop FRa3 does not change electrical state. As a consequence with the next reset signal the flip-flop FMR1 is switched to its "1" representing electrical state in which the terminal MR1 is in the higher of its two voltage states. Transistor Q128 having its base couple to the terminal MR1 now conducts as does transistor V121 and the range light RB is lit indicating a step up range has been made. If further up range is required with the end of the next count cycle another signal P3s switches the flip-flop FRa2 to its other electrical state in which the terminal $\overline{Ra2}$ now goes to the higher of its two voltage setates. This signal is coupled to the base of transistor Q120 which switches the flip-flop FRa3 to its "1" representing electrical state in which the terminal Ra3 switches to its higher voltage state. With the next reset signal the flip-flop FMR1 switches so that its terminal $\overline{MR1}$ is high and the flip-flop FMR2 switches so that its terminal MR2 is in the higher of its two voltage states. Transistor Q130 has its base coupled to the terminal MR2 and becomes conducting as does transistor Q131 which lights range indicator RC.

Switches S3 and S4 which may be gauged manually switch the storage flip-flops independently of the range counter through the diode coupling circuits shown.

As will be seen, the output terminals of the memory flip-flops FMR1 and FMR2 are connected to a resistor control circuit RCC having output terminals coupled to respective attenuator relay circuits designated relay A, relay B and relay C. The logical combination of memory flip-flop terminals in this relay control circuit corresponds to that in the indicator circuit and the output of this relay control circuit represented in the line identified "range control circuit" in FIG. 1 selectively controls the relays in the atttenuator in input voltage circuit I. In view of the fact that such attenuator circuits and relay switching circuits are well known in the art no effort is made herein to illustrate these circuits in detail.

Although two embodiments of this invention have been described, it will be appreciated by those skilled in the art that numerous changes may be made herein with respect to the detail organization of the system elements and with respect to the details of such elements without departing from the spirit and scope of this invention. Accordingly, it is intended that the foregoing disclosure and the illustrations in the drawings shall be considered only as illustrative of the principles of this invention and not construed in a limited sense.

What is claimed is:

1. A digital voltmeter comprising:
- an attenuator having an input circuit, having a control circuit and having an output circuit;
- a converter having an input circuit coupled to said output circuit of said attenuator and having an output circuit, and producing a time varying output signal;
- digital utilization means having an input circuit and having a read-out device having an output circuit;
- an oscillator;
- a counter coupled to and controlled by said oscillator and having a drive signal output circuit and a control signal output circuit;
- switch means having a first input circuit coupled to said drive signal output circuit, having a second input circuit coupled to said control signal output circuit, and having an output circuit;
- gating means having a first input circuit coupled to said output circuit of said converter having a second input circuit coupled to said output circuit of said switch means and having an output circuit coupled to said input circuit of said digital utilizaton means; and
- control means having an input circuit coupled to said output circuit of said read-out device and having an output circuit coupled to said control circuit of said attenuator.

References Cited

UNITED STATES PATENTS

| | | | |
|---|---|---|---|
| 2,994,825 | 8/1961 | Anderson | 324—120 XR |
| 3,064,193 | 11/1962 | Grubb et al. | 324—120 |
| 3,127,601 | 3/1964 | Kaenel | 340—347 |
| 3,201,781 | 8/1965 | Holland | 324—99 XR |

WILLIAM F. LINDQUIST, Primary Examiner

E. F. KARLSEN, Assistant Examiner

U.S. Cl. X.R.

324—120; 340—347